US007844527B2

(12) United States Patent
Mannion

(10) Patent No.: US 7,844,527 B2
(45) Date of Patent: Nov. 30, 2010

(54) METHOD AND SYSTEM FOR MEASURING INVESTMENT PERFORMANCE

(75) Inventor: Graham John Mannion, London (GB)

(73) Assignee: PensionDCisions Limited, Bedford (GB)

( * ) Notice: Subject to any disclaimer, the term of this patent is extended or adjusted under 35 U.S.C. 154(b) by 326 days.

(21) Appl. No.: 11/462,005

(22) Filed: Aug. 2, 2006

(65) Prior Publication Data

US 2007/0050276 A1 Mar. 1, 2007

Related U.S. Application Data

(60) Provisional application No. 60/735,721, filed on Nov. 11, 2005.

(30) Foreign Application Priority Data

Aug. 30, 2005 (GB) ................................ 0517613.6

(51) Int. Cl.
*G06Q 40/00* (2006.01)
(52) U.S. Cl. ...................................... 705/36 R; 705/35
(58) Field of Classification Search .................... 705/36
See application file for complete search history.

(56) References Cited

U.S. PATENT DOCUMENTS 6,064,986 A * 5/2000 Edelman .................... 705/36 R (Continued)

FOREIGN PATENT DOCUMENTS

MX PA01004662 9/2002

(Continued)

OTHER PUBLICATIONS

Mahoney, Joe; Murphy, Jeanne; Keogh, Sean; "The internal rate of return and institutional performance measurement for real estate portfolios"; Summer 1998; Real Estate Finance; vol. 15, No. 2; pp. 63-72.*

(Continued)

*Primary Examiner*—Kambiz Abdi
*Assistant Examiner*—Leland Marcus
(74) *Attorney, Agent, or Firm*—Greenberg Traurig, LLP

(57) ABSTRACT

The present invention relates to a method and system for measuring investment performance (e.g., total portfolio performance of individuals). In one example (which example is intended to be illustrative and not restrictive), the method and system may be used for measuring investment performance of personal pension portfolios. In another example (which example is intended to be illustrative and not restrictive), the method and system may provide for measuring performance of an investment portfolio held by an investor, comprising: providing first information indicating how the investment portfolio has performed over one or more predetermined periods of time; and providing second information indicating how investment portfolios of the investor's peer group have performed (e.g., on average) over the predetermined period(s) of time. In other examples (which examples are intended to be illustrative and not restrictive), the present invention may be used to pool data across employers in relation to pension funds and/or to pool data across wealth management firms or trust companies in relation to underlying client accounts. In another example (which example is intended to be illustrative and not restrictive), simplified portfolio level reporting and comparison of asset allocation strategies may be implemented by the present invention via the categorization of essentially all available financial products into a relatively small number of asset classes (e.g., between about 15 and 20 asset classes).

26 Claims, 29 Drawing Sheets

U.S. PATENT DOCUMENTS

| | | | |
|---|---|---|---|
| 6,078,904 | A | 6/2000 | Rebane |
| 6,154,731 | A | 11/2000 | Monks et al. |
| 6,405,204 | B1 | 6/2002 | Baker et al. |
| 6,996,539 | B1 | 2/2006 | Wallman |
| 7,016,872 | B1* | 3/2006 | Bettis et al. ............... 705/36 R |
| 7,028,006 | B1 | 4/2006 | Marsden et al. |
| 7,050,998 | B1 | 5/2006 | Kale et al. |
| 7,110,971 | B2 | 9/2006 | Wallman |
| 7,117,176 | B2 | 10/2006 | Wallman |
| 7,546,263 | B2* | 6/2009 | Columbus et al. ......... 705/36 R |
| 7,788,156 | B2* | 8/2010 | Columbus et al. ............. 705/35 |
| 7,788,165 | B2* | 8/2010 | Columbus et al. ............. 705/37 |
| 2001/0042037 | A1 | 11/2001 | Kam et al. |
| 2001/0051907 | A1 | 12/2001 | Kumar et al. |
| 2002/0019791 | A1 | 2/2002 | Goss et al. |
| 2002/0022988 | A1* | 2/2002 | Columbus et al. ............. 705/11 |
| 2002/0035527 | A1 | 3/2002 | Corrin |
| 2002/0046145 | A1 | 4/2002 | Ittai |
| 2002/0062272 | A1 | 5/2002 | Kim et al. |
| 2002/0169701 | A1 | 11/2002 | Tarbox et al. |
| 2003/0018556 | A1 | 1/2003 | Squyres |
| 2003/0046209 | A1 | 3/2003 | Brandenberger et al. |
| 2003/0046219 | A1 | 3/2003 | Rosedale et al. |
| 2003/0093348 | A1 | 5/2003 | Finn |
| 2003/0093353 | A1 | 5/2003 | Ward et al. |
| 2003/0097324 | A1 | 5/2003 | Speckman |
| 2003/0130923 | A1 | 7/2003 | Charnley, Jr. |
| 2003/0212621 | A1 | 11/2003 | Poulter et al. |
| 2004/0024677 | A1 | 2/2004 | Wallman |
| 2004/0111349 | A1* | 6/2004 | Charnley, Jr. ................. 705/36 |
| 2004/0111350 | A1 | 6/2004 | Charnley, Jr. |
| 2004/0117283 | A1 | 6/2004 | Germack |
| 2004/0117286 | A1 | 6/2004 | Charnley, Jr. |
| 2004/0172353 | A1 | 9/2004 | Charnley, Jr. |
| 2004/0172354 | A1 | 9/2004 | Charnley, Jr. |
| 2004/0177022 | A1* | 9/2004 | Williams et al. ............. 705/36 |
| 2004/0215493 | A1* | 10/2004 | Koppes et al. ................. 705/4 |
| 2004/0225586 | A1 | 11/2004 | Woods et al. |
| 2005/0033676 | A1 | 2/2005 | Charnley, Jr. |
| 2005/0075962 | A1 | 4/2005 | Dunne |
| 2005/0228734 | A1* | 10/2005 | Pagani ........................ 705/36 |
| 2005/0273407 | A1 | 12/2005 | Black et al. |
| 2006/0010053 | A1 | 1/2006 | Farrow |
| 2006/0041491 | A1 | 2/2006 | Smith et al. |
| 2006/0059063 | A1 | 3/2006 | LaComb et al. |
| 2006/0161492 | A1* | 7/2006 | Bettis et al. ................... 705/35 |
| 2006/0161493 | A1* | 7/2006 | Columbus et al. ............. 705/35 |

FOREIGN PATENT DOCUMENTS

| | | |
|---|---|---|
| WO | WO96/06402 | 2/1996 |
| WO | WO98/44444 | 10/1998 |
| WO | WO00/26843 | 5/2000 |
| WO | WO00/39734 | 7/2000 |
| WO | WO00/68852 | 11/2000 |
| WO | WO00/79433 | 12/2000 |
| WO | WO/01/35311 | 5/2001 |
| WO | WO01/50382 | 7/2001 |
| WO | WO01/80143 | 10/2001 |
| WO | WO01/86557 | 11/2001 |
| WO | WO01/93164 | 12/2001 |
| WO | WO02/082233 | 10/2002 |
| WO | WO2004/017169 | 2/2004 |
| WO | WO2005/017678 | 2/2005 |
| WO | WO2005/094284 | 10/2005 |

OTHER PUBLICATIONS

Badrinath, Swaminathan G., "Individual Investor Portfolio Performance and Trading Behavior"; Purdue University; Ph.D. 1985.

Richardson, Julie Agnew, "Essays in Individual Behavior in 401(K) Plans"; Sep. 2001.

Guidance Statement on Calculation Methodology (Revised); Jan. 1, 2006.

The Vanguard Group "How America Saves 2002"; A Report on Vanguard Defined Contribution Plans.

Lamber, R., Larcker, R, and Verrecchia, R. "Portfolio Considerations in Valuing Executive Compensation", Journal of Accounting Research, vol. 29, No. 1 (Spring, 1991), pp. 129-149.

Khorana, Ajay and Nelling, E; "The Performance, Risk and Diversification of Sector Funds"; Financial Analysts Journal.

Craig, D. "Management Graphics: An Analysis of Individual Preference" The Pennsylvania State University.

Vanguard "How America Saves 2007"; A Report on Vanguard 2006 Defined Contribution Plan Data.

Vanguard "How America Saves 2006"; A Report on Vanguard 2005 Defined Contribution Plan Data.

"White Paper on Governance of Collective Investment Schemes"; Financial Market Trends, vol. 88, 137 (32; Mar. 2005.

Wolosky, H. "The Arrival of Hedge Funds: Hedge Funds are Getting Plenty of Attention. Which if any, of your clients should invest in them?"; Dec. 2005.

Lease, Ronald C., "The Individual Investor: A Multivariate Analysis of Demographic, Strategy, and Transaction Characteristics"; Purdue University, Ph.D., 1973.

Tan, Kai-Jaw, "The Optimum Portfolio Construction For An Individual Investor Using A Three-Moment Capital Asset Pricing Model"; The University of Alabama; Ph.D. 1985.

Abstract: White Paper on Governance of Collective Investment Schemes (CIS).

Casarin R, Lazzarin M, Pelizzon L, and Sartore, D. Relative Benchmark Rating and Persistence Analysis: Evidence from Italian Equity Funds; The European Journal of Finance; vol. 11, No. 4, 297-308, Aug. 2005.

Khorana, A. and Nelling, E. "The Performance, Risk, and Diversification of Sector Funds".

Vanguard; "How America Saves 2005"; A Report on Vanguard 2004 Defined Contribution Plan Data.

Vanguard; "How America Saves"; A Report on Vanguard 2004 Defined Contribution Plan Data.

Investec Private Bank; "Investec Trust Launches Performance Investment Monitoring Service"; Jun. 2005.

Investec "Risk Monitoring Service Launched" Jul. 1, 2005.

Experian- A World of Insight—4 pages.

Solutions Overview; AdvisorView; "Grow revenue through deeper customer relationships" 2007 Yodlee, Inc.

Utkus, S. and Young, J. "Participant Report Card for Dec. 2003: Rising Stock Prices Contribute To Higher Returns and Account Balances"; Research, Feb. 2004.

Avery, Albert Elliott, "Realized Investment Performance Differentials: The Individual Investor" Purdue University, PH.D., 1978.

Hevert, Kathleen Thomas, Ph.D., "The Economic Determinants of Individual Investor Portfolio Allocation" The University of North Carolina at Chapel Hill, 1987.

Utkus, Stephen P., "Participant Report Card for 2002: The Impact of the Bear Market on Retirement Savings Plans", The Vanguard Center for Retirement Research, Feb. 2003.

Leading Credit Card and Mortgage companies Now Using Scorex Business Intelligence Solutions Industry Leaders Turn to Scorex for Benchmarking, Strategic Information and Trend Analysis; Copyright (c) 2004 Newswire Association LLC, Jan. 15, 2004 (2 pages).

Stenner, Mark, "Towards better portfolio monitoring for trustees" Investec Trust; Sep. 20, 2005 (2 pages).

MEFOP, Russell-Mellon to launch pension fund performance measure; May 30, 2001; (1 page).

Abandoning the herd; Pensions Age; Feb. 28, 2004; Copyright Perspective Publishing 2004 (3 pages).

"Applications of Simulation Models in Finance And Insurance"; Proceedings of the 2003 Winter Simulation Conference S. Chick, P.J. Sanchez, D. Ferrin, and D.J. Morrice, eds.

Besenfelder and Wagner, "The Capital Asset Pricing Simulator", Management Sciences Dep't, Wells Fargo Bank, N.A. San Francisco, California.

Chen Jian, "Simulation-Based Pricing of Mortgage-Backed Securities" Fannie Mae; Proceedings of the 2004 Winter Simulation Conference R.G. Ingalls, M.D. Rossetti, J. Smith, and B.A. Peters, eds.

Geltner and Ling, "Ideal Research and Benchmark Indexes in Private Real Estate: Some Conclusions form the RERI/PREA Technical Report"; Real Estate Finance (Euromoney Institutional Investor PLC); Winter 2001, vol. 17 Issue 4, p. 17.

Hildrey, Simon "Pensions Week: Special Report: Out With Peer Groups, In the Scheme-Specific Benchmarks." Sep. 13, 2004; 3 pages.

Barrie A. and Munro J. "Time to Make Those Pension Resolutions". Financial Times (FT.Com) Dec. 1, 2003; 2 pages.

News-WM To Launch Niche Peer Groups; Pension Week; Apr. 30, 2001.

Wheelan, Hugh "European Institutions Abandon Relative Returns" Financial News Online; Sep. 28, 2004; 1 page.

Benchmarking Special Report-Balancing Act; LGCnet; Jul 19, 2001; 2 pages.

G.I.P.S.—Global Investment Performance Standards GIPS(R) Guidance Statement on Calculation Methodology; Revised Effective Date: Jan. 1, 2006.

* cited by examiner

*Table 1*

|  | Allocation | Value 12m ago (£) | 12m Return | 12m Benchmark | Value today (£) |
|---|---|---|---|---|---|
| UK equity | 25.0% | 12,500 | 8.0% | 7.0% | 13,500 |
| US equity | 25.0% | 12,500 | 7.0% | 6.0% | 13,375 |
| Bonds | 25.0% | 12,500 | 4.0% | 5.0% | 13,000 |
| Real estate | 25.0% | 12,500 | 9.0% | 9.0% | 13,625 |
| Fund e | 0% | - | - | - | - |
| Fund f | 0% | - | - | - | - |
| Fund g | 0% | - | - | - | - |
| Fund h | 0% | - | - | - | - |
| Fund i | 0% | - | - | - | - |
| Fund j | 0% | - | - | - | - |
| Fund k | 0% | - | - | - | - |
| Total | 100.0% | 50,000 | 7.0% | 6.75% | 53,500 |

FIGURE 1

*Table 2*

| Investment Performance | | Pension Value | |
|---|---|---|---|
| Your performance | 7% | Your pension value | 53,500 |
| Average for your peers* | 8% | Average for your peers | 52,800 |
| Your percentile | 49/100 | Your percentile | 63/100 |
| Deviation in asset allocation | | | |
| UK equity | -15.0% | i.e. you were underweight | |
| US equity | 5.0% | i.e. you were overweight | |
| Bonds | 21.0% | i.e. you were overweight | |
| Real estate | -11.0% | i.e. you were underweight | |

*Peer is defined as other individuals between 41 and 43 years old*

FIGURE 2

*Employee reporting which calibrates total portfolio returns and asset allocation*

OUTPUTS FOR EMPLOYEES – 3 YEAR REPORT SUMMARY - EXAMPLE

Peer Group Performance Analysis (Young Employees) – Total Return over Three Years

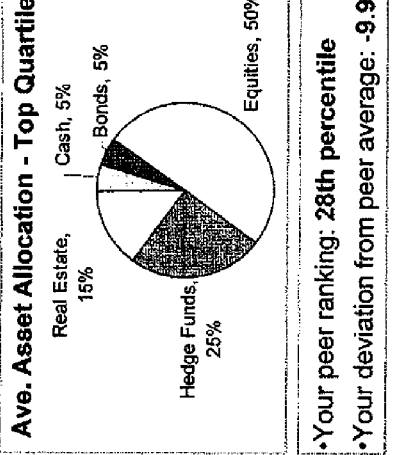

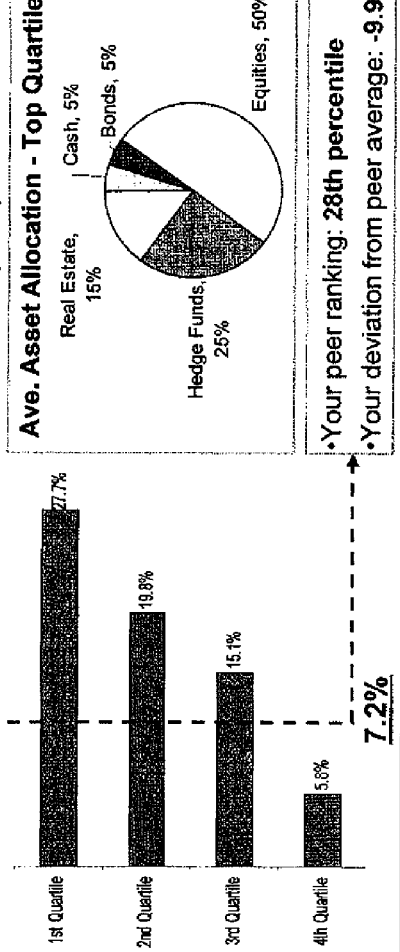

- Your asset allocation deviated from the average for the top quartile by:
  - +a% in cash
  - +b% in bonds
  - -c% in equities*
  - -d% in hedge funds
  - +e% in real estate
- You held 9 products over the period versus an average of 5.8 held by your peers

- Your peer ranking: 28th percentile
- Your deviation from peer average: -9.9%

Peer Group Saving Analysis (Young Employees) – Annual Saving as Percentage of Salary

[NOTE: We are well aware of sensitivities that may result from transparency - percentile rankings need not be extended and asset allocations can be normalised around passive indices to prevent disaffection – this is an example format only]

- Your peer ranking: 58th percentile
- Your deviation from peer average: +0.4%

- Your rate of saving is in line with the average of that for your peers
- Persisting at this rate of saving, based on certain assumptions, might yield a pension relative to your career average salary of:
  - x% at 55 yrs
  - y% at 60 yrs
  - z% at 65 yrs

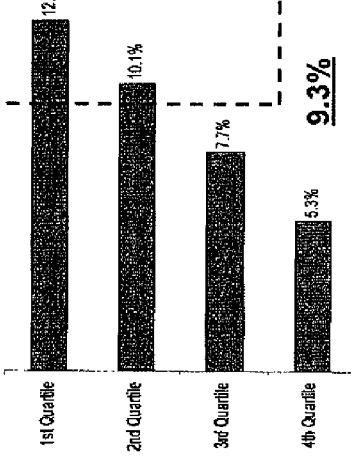

Figure 3

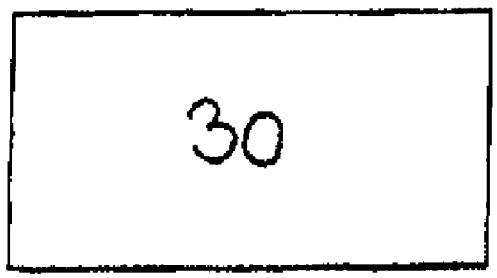
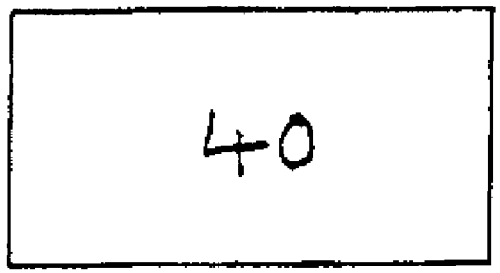
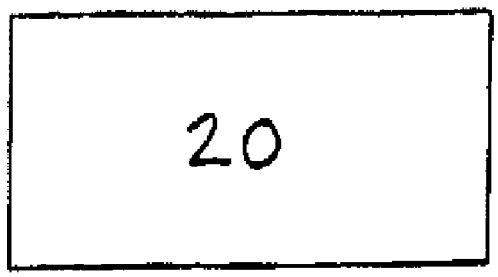
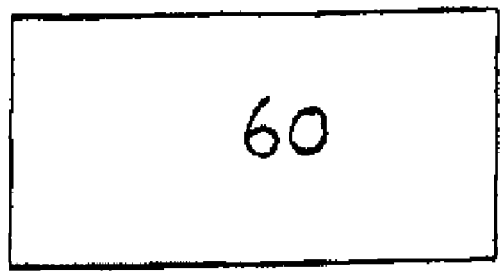
FIGURE 4

*Trustees and employers will understand properly the performance of their schemes*

OVERVIEW OF OUTPUTS FOR TRUSTEES AND EMPLOYERS

Performance Tracking
- Analyse the performance of your employee population
- Compare asset allocation decisions across schemes
- Segment employees according to age and/or seniority
- Identify meaningful patterns in / linkages between design and performance Distribution of Employee Returns

*Company x*    *Best practice employer* f                 Return

Provider Cost / Benefit Analysis
- Benchmark the value added of advisers / administrators in relation to:
  - Performance
  - Consistency across workforce
  - Fees
  - Complexity (e.g. no of holdings per individual)
- Exchange best practice and create transparency across multiple investment consultants and administrators

Liability Management
- Identify persistent underperformance or under-funding amongst the employee population
- Be proactive in flagging the need for change to 'problem employees' who could take legal action in due course
- Solution is distinctive as it does not cross the threshold into advice, the employer is simply empowering employees with tools to enhance understanding

Bespoke Investigation
- Multi-dimensional database using latest business intelligence technology
- Ad-hoc queries comparing specific metrics or groups of metrics within distinct employee segments (defined e.g. in terms of age, salary band, seniority etc)

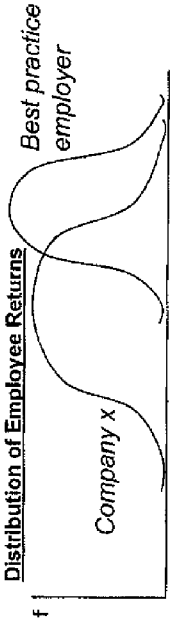

|    | A | B | C |
|----|---|---|---|
| 1  | PHASE I - Data Import and Categorisation | | |
| 2  | | | |
| 3  | Name | Joe Smith | |
| 4  | Date of birth | 16-May-65 | |
| 5  | Job Grade | H | |
| 6  | Date joined scheme | 24-Sep-97 | |
| 7  | | | |
| 8  | Product | Category | 5-Oct-05 |
| 9  | Fidelity Special Situations | European Equity - Active | 10,384.78 |
| 10 | Fidelity European | European Equity - Active | 27,868.22 |
| 11 | Fidelity Global Equity Tracker | Global Equity - Passive | 15,090.01 |
| 12 | UBS Triton Property Fund | Real Estate | 17,865.21 |
| 13 | GAM Diversity II | Hedge Funds | 12,432.78 |
| 14 | BGI Money Market Fund | Cash - Local Currency | 5,423.28 |
| 15 | | | |
| 16 | | | |
| 17 | Number of products held | | 6 |
| 18 | | | |
| 19 | Total portfolio value | | 89,084.28 |
| 20 | | | |
| 21 | New savings in 12 months to valuation date | | 8,954.23 |
| 22 | New savings as a percentage of opening balance | | 12.1% |
| 23 | | | |
| 24 | Portfolio value ex-cash injection | | 80,130.05 |
| 25 | | | |
| 26 | Performance of portfolio excluding new cash injection | | 8.7% |
| 27 | | | |
| 28 | Salary during year to date | | 35,000.00 |

Figure 8A-2

|   | D | E | F |
|---|---|---|---|
| 1 |   |   |   |
| 2 |   |   |   |
| 3 |   |   |   |
| 4 |   |   |   |
| 5 |   |   |   |
| 6 |   |   |   |
| 7 |   |   |   |
| 8 | Product | Category | 5-Oct-04 |
| 9 | Gartmore UK Fund | European Equity - Active | 17,654.30 |
| 10 | Fidelity Japan | Asia Pacific Equity - Active | 14,003.43 |
| 11 | Fidelity Global Equity Tracker | Global Equity - Passive | 20,654.33 |
| 12 | Merrill Lynch Property Fund | Real Estate | 2,876.44 |
| 13 | UBS Triton Property Fund | Real Estate | 3,322.76 |
| 14 | GAM Diversity II | Hedge Funds | 9,978.08 |
| 15 | HBOS Money Market Fund | Cash - Local Currency | 5,222.11 |
| 16 |   |   |   |
| 17 |   |   |   |
| 18 |   |   | 7 |
| 19 |   |   | 73,711.45 |
| 20 |   |   |   |
| 21 |   |   | 6,832.45 |
| 22 |   |   | 11.8% |
| 23 |   |   |   |
| 24 |   |   | 66,879.00 |
| 25 |   |   |   |
| 26 |   |   | 15.4% |
| 27 |   |   |   |
| 28 |   |   | 30,000.00 |

Figure 8A-3

| | G | H | I |
|---|---|---|---|
| 1 | | | |
| 2 | | | |
| 3 | | | |
| 4 | | | |
| 5 | | | |
| 6 | | | |
| 7 | | | |
| 8 | Product | Category | 5-Oct-03 |
| 9 | GAM UK Diversified | European Equity - Active | 12,321.12 |
| 10 | Fidelity Special Situations | European Equity - Active | 13,443.23 |
| 11 | Fidelity American | US Equity - Active | 26,897.23 |
| 12 | GAM Diversity II | Hedge Funds | 4,289.23 |
| 13 | HBOS Money Market Fund | Cash - Local Currency | 1,007.68 |
| 14 | | | |
| 15 | | | |
| 16 | | | |
| 17 | | | 5 |
| 18 | | | |
| 19 | | | 57,958.49 |
| 20 | | | |
| 21 | | | 4,887.56 |
| 22 | | | 9.7% |
| 23 | | | |
| 24 | | | 53,070.93 |
| 25 | | | |
| 26 | | | 5.8% |
| 27 | | | |
| 28 | | | 28,000.00 |

Figure 8A-4

| | J | K | L |
|---|---|---|---|
| 1 | | | |
| 2 | | | |
| 3 | | | |
| 4 | | | |
| 5 | | | |
| 6 | | | |
| 7 | | | |
| 8 | Product | Category | 5-Oct-02 |
| 9 | GAM UK Diversified | European Equity - Active | 10,641.50 |
| 10 | Griffin Eastern European | Emerging Market Equity - Active | 12,102.10 |
| 11 | Fidelity American | US Equity - Active | 22,799.80 |
| 12 | HBOS Money Market Fund | Cash - Local Currency | 4,600.10 |
| 13 | | | |
| 14 | | | |
| 15 | | | 4 |
| 16 | | | |
| 17 | | | |
| 18 | | | |
| 19 | | | 50,143.50 |
| 20 | | | |
| 21 | | | 2,985.33 |
| 22 | | | na |
| 23 | | | |
| 24 | | | 47,158.17 |
| 25 | | | |
| 26 | | | na |
| 27 | | | |
| 28 | | | 25,000.00 |

| | A | B | C |
|---|---|---|---|
| 1 | PHASE I - Data Import and Categorisation | | |
| 2 | | | |
| 3 | Name | Joe Smith | |
| 4 | Date of birth | 23878 | |
| 5 | Job Grade | | |
| 6 | Date joined scheme | 35697 | |
| 7 | | | |
| 8 | Product | Category | |
| 9 | Fidelity Special Situations | European Equity - Active | 38630 |
| 10 | Fidelity European | European Equity - Active | 10384.78 |
| 11 | Fidelity Global Equity Tracker | Global Equity - Passive | 27888.22 |
| 12 | UBS Triton Property Fund | Real Estate | 15090.01 |
| 13 | GAM Diversity II | Hedge Funds | 17865.21 |
| 14 | BGI Money Market Fund | Cash - Local Currency | 12432.78 |
| 15 | | | 5423.28 |
| 16 | | | |
| 17 | Number of products held | | 6 |
| 18 | | | |
| 19 | Total portfolio value | | =SUM(C9:C15) |
| 20 | | | |
| 21 | New savings in 12 months to valuation date | | 8954.23 |
| 22 | New savings as a percentage of opening balance | | =C21/F19 |
| 23 | | | |
| 24 | Portfolio value ex-cash injection | | =C18-C21 |
| 25 | | | |
| 26 | Performance of portfolio excluding new cash injection | | =(C24-F19)/F19 |
| 27 | | | |
| 28 | Salary during year to date | | 35000 |

| | D | E | F |
|---|---|---|---|
| 1 | | | |
| 2 | | | |
| 3 | | | |
| 4 | | | |
| 5 | | | |
| 6 | | | |
| 7 | | | |
| 8 | Product | Category | |
| 9 | Gartmore UK Fund | European Equity - Active | 38265 |
| 10 | Fidelity Japan | Asia Pacific Equity - Active | 17654.3 |
| 11 | Fidelity Global Equity Tracker | Global Equity - Passive | 14003.43 |
| 12 | Merrill Lynch Property Fund | Real Estate | 20654.33 |
| 13 | UBS Triton Property Fund | Real Estate | 2876.44 |
| 14 | GAM Diversity II | Hedge Funds | 3322.76 |
| 15 | HBOS Money Market Fund | Cash - Local Currency | 9978.08 |
| 16 | | | 5222.11 |
| 17 | | | |
| 18 | | | 7 |
| 19 | | | =SUM(F9:F15) |
| 20 | | | |
| 21 | | | 6832.45 |
| 22 | | | =F21/I19 |
| 23 | | | |
| 24 | | | =F19-F21 |
| 25 | | | |
| 26 | | | =(F24-I19)/I19 |
| 27 | | | |
| 28 | | | 30000 |

|   | G | H | I |
|---|---|---|---|
| 1 |   |   |   |
| 2 |   |   |   |
| 3 |   |   |   |
| 4 |   |   |   |
| 5 |   |   |   |
| 6 |   |   |   |
| 7 |   |   |   |
| 8 | Product | Category |   |
| 9 | GAM UK Diversified | European Equity - Active | 37899 |
| 10 | Fidelity Special Situations | European Equity - Active | 12321.12 |
| 11 | Fidelity American | US Equity - Active | 13443.23 |
| 12 | GAM Diversity II | Hedge Funds | 26897.23 |
| 13 | HBOS Money Market Fund | Cash - Local Currency | 4289.23 |
| 14 |   |   | 1007.88 |
| 15 |   |   |   |
| 16 |   |   |   |
| 17 |   |   |   |
| 18 |   |   | 5 |
| 19 |   |   | =SUM(I9:I15) |
| 20 |   |   |   |
| 21 |   |   | 4887.56 |
| 22 |   |   | =I21/L19 |
| 23 |   |   |   |
| 24 |   |   | =I19-I21 |
| 25 |   |   |   |
| 26 |   |   | =(I24-L19)/L19 |
| 27 |   |   |   |
| 28 |   |   | 28000 |

Figure 8B-3

|   | J | K | L |
|---|---|---|---|
| 1 |   |   |   |
| 2 |   |   |   |
| 3 |   |   |   |
| 4 |   |   |   |
| 5 |   |   |   |
| 6 |   |   |   |
| 7 |   |   |   |
| 8 | Product | Category |   |
| 9 | GAM UK Diversified | European Equity - Active | 37534 |
| 10 | Griffin Eastern European | Emerging Market Equity - Active | 10641.5 |
| 11 | Fidelity American | US Equity - Active | 12102.1 |
| 12 | HBOS Money Market Fund | Cash - Local Currency | 22799.8 |
| 13 |   |   | 4600.1 |
| 14 |   |   |   |
| 15 |   |   |   |
| 16 |   |   |   |
| 17 |   |   |   |
| 18 |   |   |   |
| 19 |   |   | =SUM(L8:L15) |
| 20 |   |   |   |
| 21 |   |   | 2985.33 |
| 22 |   |   |   |
| 23 |   |   | na |
| 24 |   |   | =L19-L21 |
| 25 |   |   |   |
| 26 |   |   | na |
| 27 |   |   |   |
| 28 |   |   | 25000 |

| | A | B | C | D | E |
|---|---|---|---|---|---|
| 1 | PHASE III - Peer Group Performance Analysis | | | | |
| 2 | | | | | |
| 3 | Name | Joe Smith | Joe Smith | Joe Smith | Joe Smith |
| 4 | Valuation date | 5-Oct-05 | 5-Oct-04 | 5-Oct-03 | 5-Oct-02 |
| 5 | Date of birth | 16-May-65 | 16-May-65 | 16-May-65 | 16-May-65 |
| 6 | Current job grade | H | H | H | H |
| 7 | Date joined scheme | 24-Sep-97 | 24-Sep-97 | 24-Sep-97 | 24-Sep-97 |
| 8 | | | | | |
| 9 | No. Products held | 6 | 7 | 5 | 4 |
| 10 | | | | | |
| 11 | Cash - Local Currency | 5,423.28 | 5,222.11 | 1,007.68 | 4,800.10 |
| 12 | Cash - Foreign Currency | 0 | 0 | 0 | 0 |
| 13 | | | | | |
| 14 | Bonds - Local currency | 0 | 0 | 0 | 0 |
| 15 | Bonds - Foreign currency | 0 | 0 | 0 | 0 |
| 16 | | | | | |
| 17 | Global Equity - Active | 0 | 0 | 0 | 0 |
| 18 | European Equity - Active | 38,273.00 | 31,857.73 | 25,764.35 | 10,841.50 |
| 19 | Asia Pacific Equity - Active | 0 | 0 | 0 | 0 |
| 20 | US Equity - Active | 0 | 0 | 26,897.23 | 22,799.80 |
| 21 | Emerging Market Equity - Active | 0 | 0 | 0 | 12,102.10 |
| 22 | | | | | |
| 23 | Global Equity - Passive | 15,090.01 | 20,654.33 | 0 | 0 |
| 24 | European Equity - Passive | 0 | 0 | 0 | 0 |
| 25 | Asia Pacific Equity - Passive | 0 | 0 | 0 | 0 |
| 26 | US Equity - Passive | 0 | 0 | 0 | 0 |
| 27 | Emerging Market Equity - Passive | 0 | 0 | 0 | 0 |
| 28 | | | | | |
| 29 | Hedge Funds | 12,432.78 | 9,978.08 | 4,289.23 | 0 |
| 30 | | | | | |
| 31 | Real Estate | 17,865.21 | 6,199.20 | 0 | 0 |
| 32 | | | | | |
| 33 | Other | 0 | 0 | 0 | 0 |
| 34 | | | | | |
| 35 | TOTAL | 89,084.28 | 73,711.45 | 57,958.49 | 50,143.50 |
| 36 | 1 Yr Performance excluding fresh savings balance | 8.7% | 15.4% | 5.8% | na |
| 37 | 2 Yr Performance excluding fresh savings balances | 25.4% | | | |
| 38 | 3 Yr Performance excluding fresh savings balances | 32.8% | | | |
| 39 | | | | | |
| 40 | Amount saved in period | 8,954.23 | 6,832.45 | 4,887.58 | 2,985.33 |
| 41 | Savings as a percentage of opening balance | 12.1% | 11.8% | 9.7% | na |

Figure 9A-2

| | F | G | H | I | J | K | L | M |
|---|---|---|---|---|---|---|---|---|
| 1 | | | | | | | | |
| 2 | | | | | | | | |
| 3 | Fred Jones | Fred Jones | Fred Jones | Fred Jones | Pete White | Pete White | Pete White | Pete White |
| 4 | 5-Oct-05 | 5-Oct-04 | 5-Oct-03 | 5-Oct-02 | 5-Oct-05 | 5-Oct-04 | 5-Oct-03 | 5-Oct-02 |
| 5 | 17-Aug-64 | 17-Aug-64 | 17-Aug-64 | 17-Aug-64 | 2-Jan-66 | 2-Jan-66 | 2-Jan-66 | 2-Jan-66 |
| 6 | F | F | F | F | G | G | G | G |
| 7 | 13-Jan-94 | 13-Jan-94 | 13-Jan-94 | 13-Jan-94 | 12-Nov-90 | 12-Nov-90 | 12-Nov-90 | 12-Nov-90 |
| 8 | | | | | | | | |
| 9 | 9 | 8 | 10 | 6 | 8 | 9 | 9 | 3 |
| 10 | | | | | | | | |
| 11 | 2231.20 | 1887.20 | 899.70 | 600.89 | etc | etc | etc | etc |
| 12 | 1034.10 | 589.09 | 1200.54 | 1212.34 | etc | etc | etc | etc |
| 13 | | | | | | | | |
| 14 | 1334.02 | 0 | 0 | 0 | etc | etc | etc | etc |
| 15 | 0 | 987.54 | 0 | 0 | etc | etc | etc | etc |
| 16 | | | | | | | | |
| 17 | 15443.87 | 10489.65 | 7798.30 | 6554.22 | etc | etc | etc | etc |
| 18 | 0 | 0 | 0 | 0 | | | | |
| 19 | 0 | 4667.54 | 3544.33 | 8067.54 | etc | etc | etc | etc |
| 20 | 3454.34 | 0 | 0 | 0 | | | | |
| 21 | 1344.02 | 0 | 0 | 0 | | | | |
| 22 | | | | | | | | |
| 23 | 0 | 0 | 0 | 0 | etc | etc | etc | etc |
| 24 | 0 | 0 | 1285.30 | 887.98 | | | | |
| 25 | 2265.40 | 1877.50 | 0 | 0 | etc | etc | etc | etc |
| 26 | 0 | 0 | 0 | 0 | | | | |
| 27 | 0 | 0 | 0 | 0 | | | | |
| 28 | | | | | | | | |
| 29 | 9937.54 | 0 | 0 | 3098.00 | etc | etc | etc | etc |
| 30 | | | | | | | | |
| 31 | 0 | 7989.76 | 7704.32 | 0 | etc | etc | etc | etc |
| 32 | | | | | | | | |
| 33 | 0 | 0 | 0 | 0 | | | | |
| 34 | | | | | | | | |
| 35 | 37,044.49 | 28,488.28 | 22,412.49 | 20,420.97 | etc | etc | etc | etc |
| 36 | 17.9% | 16.7% | 1.6% | | | | | |
| 37 | 37.7% | | | | | | | |
| 38 | 39.9% | | | | | | | |
| 39 | | | | | | | | |
| 40 | 3448.01 | 2322.12 | 1887.54 | 1021.32 | etc | etc | etc | etc |
| 41 | 12.1% | 10.4% | 8.2% | na | etc | etc | etc | etc |

Figure 9B-1

| | A | B | C | D | E |
|---|---|---|---|---|---|
| 1 | PHASE III - Peer Group Performance Analysis | | | | |
| 2 | | | | | |
| 3 | Name | | | | |
| 4 | Valuation date | | | | |
| 5 | Date of birth | | | | |
| 6 | Current job grade | | | | |
| 7 | Data joined scheme | | | | |
| 8 | | | | | |
| 9 | No. Products held | =Phase I!B3 | =B3 | =B3 | =B3 |
| 10 | | =Phase I!C6 | =Phase I!F6 | =Phase I!I9 | =Phase I!L8 |
| 11 | Cash - Local Currency | =Phase I!B4 | =B5 | =B5 | =B5 |
| 12 | Cash - Foreign Currency | =Phase I!B5 | =B6 | =B6 | =B6 |
| 13 | | =Phase I!B6 | =B7 | =B7 | =B7 |
| 14 | Bonds - Local currency | | | | |
| 15 | Bonds - Foreign currency | =Phase I!C17 | =Phase I!F17 | =Phase I!I17 | =Phase I!L17 |
| 16 | | | | | |
| 17 | Global Equity - Active | =Phase I!C14 | =Phase I!F15 | =Phase I!I13 | =Phase I!L12 |
| 18 | European Equity - Active | 0 | 0 | 0 | 0 |
| 19 | Asia Pacific Equity - Active | 0 | 0 | 0 | 0 |
| 20 | US Equity - Active | 0 | 0 | 0 | 0 |
| 21 | Emerging Market Equity - Active | =Phase I!C9+Phase I!C10 | =Phase I!F9+Phase I!F10 | =Phase I!I9+Phase I!I10 | =Phase I!L9 |
| 22 | | =Phase I!C11 | =Phase I!F11 | =Phase I!I15 | =Phase I!L11 |
| 23 | Global Equity - Passive | 0 | 0 | 0 | =Phase I!L10 |
| 24 | European Equity - Passive | 0 | 0 | 0 | 0 |
| 25 | Asia Pacific Equity - Passive | 0 | 0 | 0 | 0 |
| 26 | US Equity - Passive | 0 | 0 | 0 | 0 |
| 27 | Emerging Market Equity - Passive | 0 | 0 | 0 | 0 |
| 28 | | | | | |
| 29 | Hedge Funds | =Phase I!C13 | =Phase I!F14 | =Phase I!I12 | 0 |
| 30 | | | | | |
| 31 | Real Estate | =Phase I!C12 | =Phase I!F12+Phase I!F13 | 0 | 0 |
| 32 | | | | | |
| 33 | Other | 0 | 0 | 0 | 0 |
| 34 | | | | | |
| 35 | TOTAL | =SUM(B11:B33) | =SUM(C11:C33) | =SUM(D11:D35) | =SUM(E11:E33) |
| 36 | 1 Yr Performance excluding fresh savings balance | =Phase I!C26 | =Phase I!F26 | =Phase I!I25 | |
| 37 | 2 Yr Performance excluding fresh savings balances | =(1+C36)*(1+B36)-1 | | | |
| 38 | 3 Yr Performance excluding fresh savings balances | =(1+D36)*(1+B37)-1 | | | |
| 39 | | | | | |
| 40 | Amount saved in period | =Phase I!C21 | =Phase I!F21 | =Phase I!I21 | =Phase I!L21 |
| 41 | Savings as a percentage of opening balance | =Phase I!C22 | =Phase I!F22 | =Phase I!I22 | |

| Step | Record Type | Level | Operation | Metric |
|---|---|---|---|---|
| 1 | | | Operation | Metric |
| 2 | | 4 | Fund | Employee contributions received in LCY * applicable exchange rate | Core employee fund saving in GBP |
| 3 | | 4 | Fund | Employee additional contributions received in LCY * applicable exchange rate | Voluntary employee fund saving in GBP |
| 4 | Calc Field | Portfolio | Sum of all core employee fund saving in GBP | Core employee portfolio saving in GBP |
| 5 | Calc Field | Portfolio | Sum of all voluntary employee fund saving in GBP | Voluntary employee portfolio saving in GBP |
| 6 | | 4 | Fund | Employer contributions received in LCY * applicable exchange rate | Core employer fund saving in GBP |
| 7 | | 4 | Fund | Employer additional contributions received in LCY * applicable exchange rate | Voluntary employer fund saving in GBP |
| 8 | Calc Field | Portfolio | Sum of all core employer fund saving in GBP | Core employer portfolio saving in GBP |
| 9 | Calc Field | Portfolio | Sum of all voluntary employer fund saving in GBP | Voluntary employer portfolio saving in GBP |
| 10 | Calc Field | Portfolio | Core employee portfolio saving in GBP / pensionable salary | Monthly core employee saving rate |
| 11 | Calc Field | Portfolio | Voluntary employee portfolio saving in GBP / pensionable salary | Monthly voluntary employee saving rate |
| 12 | Calc Field | Portfolio | Core employer portfolio saving in GBP / pensionable salary | Monthly core employer saving rate |
| 13 | Calc Field | Portfolio | Voluntary employer portfolio saving in GBP / pensionable salary | Monthly voluntary employer saving rate |
| 14 | Calc Field | Portfolio | Monthly core employee saving rate + monthly voluntary employee saving rate | Monthly total employee saving rate |
| 15 | Calc Field | Portfolio | Monthly core employer saving rate + monthly voluntary employer saving rate | Monthly total employer saving rate |
| 16 | Calc Field | Portfolio | Monthly core employee saving rate + monthly core employer saving rate | Monthly core contribution rate |
| 17 | Calc Field | Portfolio | Monthly voluntary employee saving rate + monthly voluntary employer saving rate | Monthly voluntary contribution rate |

Figure 13

| Step | Record Type | Level | Operation | Metric |
|---|---|---|---|---|
| 1 | | 3 | | |
| 2 | Calc field | Fund | Total fund value in LCY * applicable exchange rate | Closing fund value in GBP |
| 3 | Calc field | Portfolio | Sum all closing fund values in GBP in cash category | Closing cash balance |
| 4 | Calc field | Portfolio | Sum all closing fund values in GBP in bond category | Closing bond balance |
| 5 | Calc field | Portfolio | Sum all closing fund values in GBP in equity - Europe Ex-UK category | Closing Europe Ex-UK equity balance |
| 6 | Calc field | Portfolio | Sum all closing fund values in GBP in equity - UK category | Closing UK equity balance |
| 7 | Calc field | Portfolio | Sum all closing fund values in GBP in equity - Japan category | Closing Japan equity balance |
| 8 | Calc field | Portfolio | Sum all closing fund values in GBP in equity - Asia Ex-Japan category | Closing Asia Ex-Japan equity balance |
| 9 | Calc field | Portfolio | Sum all closing fund values in GBP in equity - North America category | Closing North America equity balance |
| 10 | Calc field | Portfolio | Sum all closing fund values in GBP in equity - Emerging Markets category | Closing Emerging Markets equity balance |
| 11 | Calc field | Portfolio | Sum all equity sub-category values in GBP | Closing total equity balance |
| 12 | Calc field | Portfolio | Sum all closing fund values in GBP in hedge category | Closing hedge balance |
| 13 | Calc field | Portfolio | Sum all closing fund values in GBP in structured category | Closing structured balance |
| 14 | Calc field | Portfolio | Import closing portfolio value in GBP from total portfolio return calculation | Closing portfolio value in GBP |
| 15 | Calc field | Portfolio | Closing cash balance / closing portfolio value in GBP | Cash weighting |
| 16 | Calc field | Portfolio | Closing bond balance / closing portfolio value in GBP | Bond weighting |
| 17 | Calc field | Portfolio | Closing Europe Ex-UK equity balance / closing portfolio value in GBP | Europe Ex-UK equity weighting |
| 18 | Calc field | Portfolio | Closing UK equity balance / closing portfolio value in GBP | UK equity weighting |
| 19 | Calc field | Portfolio | Closing Japan equity balance / closing portfolio value in GBP | Japan equity weighting |
| 20 | Calc field | Portfolio | Closing Asia Ex-Japan equity balance / closing portfolio value in GBP | Asia Ex-Japan equity weighting |
| 21 | Calc field | Portfolio | Closing North America equity balance / closing portfolio value in GBP | North America equity weighting |
| 22 | Calc field | Portfolio | Closing Emerging Markets equity balance / closing portfolio value in GBP | Emerging Markets equity weighting |
| 23 | Calc field | Portfolio | Closing total equity balance / closing portfolio value in GBP | Total equity weighting |
| 24 | Calc field | Portfolio | Closing hedge balance / closing portfolio value in GBP | Hedge weighting |
| 25 | Calc field | Portfolio | Closing structured balance / closing portfolio value in GBP | Structured weighting |
| 26 | | | | |

Figure 19

| | A | B | C | D | E |
|---|---|---|---|---|---|
| 1 | Step | Record Type | Level | Operation | Metric |
| 2 | 1 | | 3 | Portfolio: Count number of cash products held | Number of cash products |
| 3 | 2 | | 3 | Portfolio: Count number of bond products held | Number of bond products |
| 4 | 3 | | 3 | Portfolio: Count number of equity products held | Number of equity products |
| 5 | 4 | | 3 | Portfolio: Count number of hedge products held | Number of hedge products |
| 6 | 5 | | 3 | Portfolio: Count number of structured products held | Number of structured products |
| 7 | 6 | Calc Field | | Portfolio: Sum number of products held across all categories | Total number of products held |
| 8 | | | | | |

Figure 13

| | A | B | C | D | E | F | G | H | I |
|---|---|---|---|---|---|---|---|---|---|
| 1 | Product Long Name | Active / Passive | Asset Class | Region | Sub-Region | Additional Designation | Fund Currency | True Currency Exposure | Allocation Overlay Required? |
| 2 | A | P | Bond | na | | | GBP | GBP | No |
| 3 | B | P | Equity | Europe | Europe Ex-UK | | GBP | EUR | No |
| 4 | C | P | Equity | Asia | Japan | | GBP | JPY | No |
| 5 | D | P | Equity | Asia | Asia Ex-Japan | | GBP | USD as proxy | No |
| 6 | E | P | Equity | Europe | UK | Small Cap | GBP | GBP | No |
| 7 | F | P | Equity | Europe | UK | | GBP | GBP | No |
| 8 | G | P | Equity | North America | | | GBP | USD | No |
| 9 | H | A | Equity | Emerging Markets | | | GBP | USD as proxy | No |
| 10 | I | A | Equity | Emerging Markets | | | GBP | USD as proxy | No |
| 11 | J | A | Hedge | Convertible Arbitrage | | | GBP | EUR | No |
| 12 | K | A | Hedge | Multi-Strategy | | | GBP | USD | No |
| 13 | L | A | Structured | na | | | GBP | EUR | No |
| 14 | M | A | Structured | na | | | GBP | EUR | No |
| 15 | N | A | Hedge | Equity Long / Short | | | GBP | EUR | No |
| 16 | O | A | Hedge | Statistical Arbitrage | | | GBP | USD | No |
| 17 | P | P | Bond | na | | | GBP | GBP | No |
| 18 | Q | P | Bond | na | | | GBP | GBP | No |
| 19 | R | P | Cash | na | | | GBP | GBP | No |
| 20 | S | P | Multi | Multi | | | GBP | USD as proxy | Split by asset class, then equity element split by region |
| 21 | T | P | Equity | Emerging Markets | | | GBP | USD as proxy | No |
| 22 | U | P | Cash | na | | | GBP | USD as proxy | No |
| 23 | V | P | Cash | na | | | GBP | GBP | No |
| 24 | W | P | Cash | na | | | GBP | USD | No |
| 25 | X | P | Cash | na | | | GBP | EUR | No |

Figure 16

Sample Outputs

Investment Return Calculation Sample Output

| Fund Code | Opening Fund Value | Fund Price Currency | Conversion Factor | Opening Fund Value in GBP |
|---|---|---|---|---|
| A | 2,594 | GBP | 1 | 2,594 |
| B | 20,107 | GBP | 1 | 20,107 |
| C | 2,350 | GBP | 1 | 2,350 |

| Opening Portfolio Value in GBP | 25,051 |
|---|---|

| Fund Code | Closing Fund Value | Fund Price Currency | Conversion Factor | Closing Fund Value in GBP |
|---|---|---|---|---|
| A | 2,677 | GBP | 1 | 2,577 |
| B | 20,758 | GBP | 1 | 20,758 |
| C | 2,428 | GBP | 1 | 2,428 |

| Closing Portfolio Value in GBP | 25,763 |
|---|---|

| Fund Code | Opening Fund Value (Purchase) | Opening Fund Value (Contribution) | Contribution Purchase | Contribution Purchase Fund Price Currency | Conversion Factor | Contribution Purchase | Days of Contribution Purchase | Contribution Fund Flow Factor | Contribution Fund Flow |
|---|---|---|---|---|---|---|---|---|---|
| A | - | 40 | - | GBP | 1 | 40 | 15 | 0.50 | 20 |
| B | - | 321 | - | GBP | 1 | 321 | 15 | 0.50 | 161 |
| C | - | 40 | - | GBP | 1 | 40 | 15 | 0.50 | 20 |

| Fund Code | Fund Value | Fund Price Currency | Conversion | Fund Value in GBP | Days in Period | Investment Factor |  |
|---|---|---|---|---|---|---|---|
| A | - | GBP | 1 | - | 10 | 0.67 | - |
| B | - | GBP | 1 | - | 10 | 0.67 | - |
| C | - | GBP | 1 | - | 10 | 0.67 | - |

| Fund Code | Contribution Purchase | Conversion | Gross Fund Flow in GBP | Days in Period | Gross Fund Flow Factor | Gross Fund Flow |
|---|---|---|---|---|---|---|
| A | - | GBP | 1 | - | 5 | 0.83 | - |
| B | - | GBP | 1 | - | 5 | 0.83 | - |
| C | - | GBP | 1 | - | 5 | 0.83 | - |

| Total Fund Flow in GBP | Investment Return |
|---|---|
| 40 | 20 |
| 321 | 161 |
| 40 | 20 |

| Gross Portfolio Flow in GBP | 401 |
|---|---|
| Portfolio Flow in GBP | 201 |
| Gross Portfolio Return | 311 |
| Total Portfolio Return | 1.23% |

Figure 17

Voluntary Contribution Calculation Sample Output

| Fund Code | Employee Fund Value Purchased in Period | Employee Additional Fund Value Purchased in Period | Employer Fund Value Purchased in Period | Additional Fund Value Purchased in Period | Fund Currency | Applicable Exchange Rate |
|---|---|---|---|---|---|---|
| A | - | - | 40 | - | GBP | 1 |
| B | - | - | 321 | - | GBP | 1 |
| C | - | - | 40 | - | GBP | 1 |

| Fund Code | Core Employee Fund Savings in GBP | Voluntary Employee Fund Savings in GBP | Core Employer Fund Savings in GBP | Voluntary Employer Fund Savings in GBP |
|---|---|---|---|---|
| A | - | - | 40 | - |
| B | - | - | 321 | - |
| C | - | - | 40 | - |

| | |
|---|---|
| Pensionable Salary | 54,729 |
| Core Employee Portfolio Savings in GBP | - |
| Voluntary Employee Portfolio Savings in GBP | - |
| Core Employer Portfolio Savings in GBP | 401 |
| Voluntary Employer Portfolio Savings in GBP | - |
| Monthly Core Employee Savings Rate | 0.00% |
| Monthly Voluntary Employee Savings Rate | 0.00% |
| Monthly Core Employer Savings Rate | 0.73% |
| Monthly Voluntary Employer Savings Rate | 0.00% |
| Monthly Total Employee Savings Rate | 0.00% |
| Monthly Total Employer Savings Rate | 0.73% |
| Monthly Core Contribution Rate | 0.73% |
| Monthly Voluntary Contribution Rate | 0.00% |

Figure 18

Additional Value of Voluntary Savings Look-up Table

Assumptions

| | |
|---|---|
| | 0.5% |
| | 4.0% |

| | 1 | 2 | 3 | 4 | 5 | 6 | 7 | 8 | 9 | 10 | 11 | 12 | ... |
|---|---|---|---|---|---|---|---|---|---|---|---|---|---|
| 0 | 1.040 | 1.082 | 1.125 | 1.170 | 1.217 | 1.265 | 1.316 | 1.369 | 1.423 | 1.480 | 1.539 | 1.601 | ... |
| 1 | | 1.045 | 1.087 | 1.130 | 1.176 | 1.223 | 1.272 | 1.323 | 1.375 | 1.430 | 1.488 | 1.547 | ... |
| 2 | | | 1.050 | 1.092 | 1.136 | 1.182 | 1.229 | 1.278 | 1.329 | 1.382 | 1.438 | 1.495 | ... |
| 3 | | | | 1.056 | 1.098 | 1.142 | 1.187 | 1.235 | 1.284 | 1.336 | 1.389 | 1.445 | ... |
| 4 | | | | | 1.061 | 1.103 | 1.148 | 1.193 | 1.241 | 1.291 | 1.342 | 1.396 | ... |
| 5 | | | | | | 1.066 | 1.109 | 1.153 | 1.199 | 1.247 | 1.297 | 1.349 | ... |
| 6 | | | | | | | 1.072 | 1.114 | 1.159 | 1.205 | 1.254 | 1.304 | ... |
| 7 | | | | | | | | 1.077 | 1.120 | 1.165 | 1.211 | 1.260 | ... |
| 8 | | | | | | | | | 1.082 | 1.126 | 1.171 | 1.217 | ... |
| 9 | | | | | | | | | | 1.088 | 1.131 | 1.177 | ... |
| 10 | | | | | | | | | | | 1.093 | 1.137 | ... |
| 11 | | | | | | | | | | | | 1.099 | ... |
| : | | | | | | | | | | | | | ... |
| | 1.040 | 2.127 | 3.262 | 4.448 | 5.687 | 6.981 | 7.260 | 7.551 | 7.853 | 8.167 | 8.494 | 8.833 | |

Figure 19

Additional Value of Voluntary Savings Sample Output

Assumptions

| | |
|---|---|
| | 0.5% |
| | 4.0% |

| | 1 | 2 | 3 | 4 | 5 | 6 | 7 | 8 | 9 | 10 | 11 | 12 | ... |
|---|---|---|---|---|---|---|---|---|---|---|---|---|---|
| 0 | 1.040 | 1.082 | 1.125 | 1.170 | 1.217 | 1.265 | 1.316 | 1.369 | 1.423 | 1.480 | 1.539 | 1.601 | ... |
| 1 | | 1.045 | 1.087 | 1.130 | 1.176 | 1.223 | 1.272 | 1.323 | 1.375 | 1.430 | 1.488 | 1.547 | ... |
| 2 | | | 1.050 | 1.092 | 1.136 | 1.182 | 1.229 | 1.278 | 1.329 | 1.382 | 1.438 | 1.495 | ... |
| 3 | | | | 1.056 | 1.098 | 1.142 | 1.187 | 1.235 | 1.284 | 1.336 | 1.389 | 1.445 | ... |
| 4 | | | | | 1.061 | 1.103 | 1.146 | 1.193 | 1.241 | 1.291 | 1.342 | 1.396 | ... |
| 5 | | | | | | 1.066 | 1.109 | 1.153 | 1.199 | 1.247 | 1.297 | 1.349 | ... |
| 6 | | | | | | | 1.072 | 1.114 | 1.159 | 1.205 | 1.254 | 1.304 | ... |
| 7 | | | | | | | | 1.077 | 1.120 | 1.165 | 1.211 | 1.260 | ... |
| 8 | | | | | | | | | 1.082 | 1.126 | 1.171 | 1.217 | ... |
| 9 | | | | | | | | | | 1.088 | 1.131 | 1.177 | ... |
| 10 | | | | | | | | | | | 1.093 | 1.137 | ... |
| 11 | | | | | | | | | | | | 1.099 | ... |

| | 1.040 | 2.127 | 3.262 | 4.448 | 5.687 | 6.981 | 7.260 | 7.551 | 7.853 | 8.167 | 8.494 | 8.833 |

| | F |
|---|---|
| | 780 |
| | £78,000 |

| | 06/07/2006 |
|---|---|
| | 04/06/1943 |
| | 768 |

| | 12 |
|---|---|
| | £1,000 |

| | £8,833 |
|---|---|
| | £6,890 |
| | £34,450 |
| | £68,900 |

Asset Allocation - Stock

| Fund Code | | | Applicable Exchange Rate | Closing Fund Value in GBP |
|---|---|---|---|---|
| A | 2,577 | GBP | 1 | 2,577 |
| B | 20,758 | GBP | 1 | 20,758 |
| C | 2,428 | GBP | 1 | 2,428 |

| Closing Portfolio Value in GBP | 25,763 |
|---|---|

The funds are categorized into the following asset classes:
    A    Equity - UK
    B    Bonds
    C    Cash

| Asset Allocation: | |
|---|---|
| Equity - UK | 10% |
| Bonds | 81% |
| Cash | 9% |

Asset Allocation – Flow

| Fund Code | Employee Fund Value Purchases in GBP | Employee Additional Purchases | Employer Additional Purchases | Employer Regular Fund Value Purchases | Currency | Applicable Exchange Rate | Position Fund Value in GBP |
|---|---|---|---|---|---|---|---|
| A | - | 40 | - | - | GBP | 1 | 40 |
| B | - | 321 | - | - | GBP | 1 | 321 |
| C | - | 40 | - | - | GBP | 1 | 40 |

| Savings Portfolio Flow In GBP | 401 |

The funds are categorized into the following asset classes:
- A  Equity - Europe - UK
- B  Bonds
- C  Cash

| Asset Allocation: | |
|---|---|
| Equity - Europe - UK | 10% |
| Bonds | 80% |
| Cash | 10% |

Figure 22

Number of Products Held Sample Output

| Payroll Number | Fund Code | Asset Class |
|---|---|---|
| 0001 | A | Bonds |
| 0001 | B | Bonds |
| 0001 | C | Equity |

Bonds 2
Equity 1

Figure 23

Number of Switches Sample Output

| Payroll Number | Total Value Switched In/Redirected | Fund Switch In | Fund Switch Out |
|---|---|---|---|
| 0001 | - 20.00 | - | 1 |
| 0001 | 23.11 | 1 | - |
| 0001 | - 50.10 | - | 1 |
| 0001 | 32.13 | 1 | - |
| 0001 | 12.05 | 1 | - |
| 0001 | 6.44 | 1 | - |
| 0001 | 9.04 | 1 | - |
| 0001 | - 23.11 | - | 1 |
| 0001 | - 0.04 | - | 1 |

| Total Number of Fund Switches In | 5 |
| Total Number of Fund Switches Out | 4 |

Figure 24

METHOD AND SYSTEM FOR MEASURING INVESTMENT PERFORMANCE

RELATED APPLICATIONS

This application claims the benefit of U.S. Provisional Application Ser. No. 60/735,721, filed Nov. 11, 2005. This application also claims the benefit of GB0517613.6, filed Aug. 30, 2005. Each of the aforementioned applications is incorporated herein by reference in its entirety.

FIELD OF THE INVENTION

The present invention relates to a method and system for measuring investment performance (e.g., total portfolio performance of individuals).

In one example (which example is intended to be illustrative and not restrictive), the method and system may be used for measuring investment performance of personal pension portfolios.

In another example (which example is intended to be illustrative and not restrictive), the method and system may provide for measuring performance of an investment portfolio held by an investor, comprising: providing first information indicating how the investment portfolio has performed over one or more predetermined periods of time; and providing second information indicating how investment portfolios of the investor's peer group have performed (e.g., on average) over the predetermined period(s) of time.

In other examples (which examples are intended to be illustrative and not restrictive), the present invention may be used to pool data across employers in relation to pension funds and/or to pool data across wealth management firms or trust companies in relation to underlying client accounts.

In another example (which example is intended to be illustrative and not restrictive), simplified portfolio level reporting and comparison of asset allocation strategies may be implemented by the present invention via the categorization of essentially all available financial products into a relatively small number of asset classes (e.g., between about 15 and 20 asset classes).

For the purposes of describing and claiming the present invention, the term "individual investor" is intended to refer to a single person (e.g. an individual employee of a company, an individual client of a wealth management firm, etc.).

Further, for the purposes of describing and claiming the present invention, the term "asset classes" is intended to refer to the building blocks of an investment portfolio. In this regard, investments within a particular asset class exhibit similar characteristics, behave similarly in the marketplace, and are subject to similar tax regulations within a particular tax jurisdiction. Examples include (but are not limited to) cash, bonds, equities, real estate, hedge funds and structured products. Each of these asset classes can be broken down further, for example, within equities by regions such as North America, Europe, Asia and Emerging Markets or within hedge funds by strategies such as convertible arbitrage, equity long/short and multi-strategy.

BACKGROUND OF THE INVENTION

Investors participating in a defined contribution ("DC") pension plan with regular pension statements have conventionally been provided performance information regarding investment funds in which they have invested. A typical example is described below.

An employer puts in place a pension plan which enables employees to invest in up to 10 different investment funds. An employee having a pension pot worth £50,000 chooses to invest 25% of his pension pot into the following four funds: U.K. equity, U.S. equity, U.K. bonds, and U.K. real estate. Twelve months later, the employee receives from the pension plan administrator an annual report detailing how each fund into which the employee has invested has performed over the last year, together with benchmark performance figures relating to each of the individual funds based on average sector performance. FIG. 1 shows a typical example of investment performance information provided in a conventional annual performance report. As seen in this FIG. 1, the investment performance information may include data regarding allocation, details of the valuation of funds at the beginning of the period compared with at the end of the period, and details of the 12-month returns as compared to the 12-month benchmark returns. In addition, the report outlines the impact of the performance of each fund on the value of the total pension pot.

While such performance information gives investors some indication of the relative strengths of the various funds offered within the pension plan (e.g., relative to the average sector performance (e.g. an equity benchmark such as the S&P)) the information supplied provides little or no indication of how well they are saving for retirement. Furthermore, the information supplied provides an investor with little or no indication of how their decision to split their investment across the available funds (their asset allocation decision) has impacted the performance of the portfolio. Accordingly, there is a desire to provide investors with a more informative measurement of investment performance.

BRIEF DESCRIPTION OF THE DRAWINGS

FIG. 1 shows a typical example of investment performance information provided in a conventional annual performance report;

FIG. 2 is an example of information which may be included in a performance report in accordance with an embodiment of the present invention (in relation to this FIG. 2, it is noted that such analysis could be performed over various time periods with longer periods (e.g., such as 3 and 5 years) used to identify long-term trends, whereas shorter (e.g., one year) observations may be used to reveal large deviations which do not necessarily reflect the quality of individuals' investment decision making);

FIG. 3 is an example of information which may be included in a performance report in accordance with an embodiment of the present invention (in relation to this FIG. 3, it is noted that such analysis could be performed over various time periods with longer periods (e.g., such as 5 years) used to identify long-term trends, whereas shorter (e.g., one year) observations may be used to reveal large deviations which do not necessarily reflect the quality of individuals' investment decision making);

FIG. 4 is a schematic overview of a computer system according to an embodiment of the present invention;

FIG. 7 is an example of output data for trustees and employers according to an embodiment of the present invention;

FIGS. 8A-1 through 8A-4 depict a spreadsheet showing certain aspects of an example of the present invention (FIG.

8A-1 is the left-most portion of the spreadsheet, FIG. 5A-2 is the next portion to the right of FIG. 8A-1, FIG. 5A-3 is the next portion to the right of FIG. 8A-2 and FIG. 5A-4 is the right-most portion of the spreadsheet);

FIGS. 8B-1 through 8B-4 depict a spreadsheet showing the formulas used in the spreadsheet of FIGS. 8A-1 through 8A-4 (of note, any references to "Phase III" in the formulas refers to the spreadsheet of FIG. 9; of further note, FIG. 8B-1 is the left-most portion of the spreadsheet, FIG. 8B-2 is the next portion to the right of FIG. 8B-1, FIG. 8B-3 is the next portion to the right of FIG. 8B-2 and FIG. 8B-4 is the right-most portion of the spreadsheet, of still further note, dates shown in these formula views are not actual dates (but, rather, computer representations of actual dates), of still further note, the various formulas are shown by way of example and other (e.g., more complex) formulas may be utilized);

FIGS. 9A-1 and 9A-2 depict a spreadsheet showing certain aspects of an example of the present invention (FIG. 9A-1 is the left-most portion of the spreadsheet and FIG. 9A-2 is the right-most portion of the spreadsheet);

FIGS. 9B-1 and 9B-2 depict a spreadsheet showing the formulas used in the spreadsheet of FIGS. 9A-1 and 9A-2 (of note, any references to "Phase I" in the formulas refers to the spreadsheet of FIG. 8; of further note, FIG. 9B-1 is the left-most portion of the spreadsheet and FIG. 9B-2 is the right-most portion of the spreadsheet, of still further note, dates shown in these formula views are not actual dates (but, rather, computer representations of actual dates), of still further note, the various formulas are shown by way of example and other (e.g., more complex) formulas may be utilized);

FIG. 12 shows various Investment Return Calculations according to an example of the present invention;

FIG. 13 shows various Rate Of Voluntary Savings Calculations according to an example of the present invention;

FIG. 14 shows various Asset Allocation—Stock Calculations according to an example of the present invention;

FIG. 15 shows various Number Of Products Held Calculations according to an example of the present invention;

FIG. 16 shows another example of categorization of funds into consistent asset classes according to an example of the present invention; and FIGS. 17-24 show additional examples of sample outputs according to various embodiments of the present invention.

Figure 5:
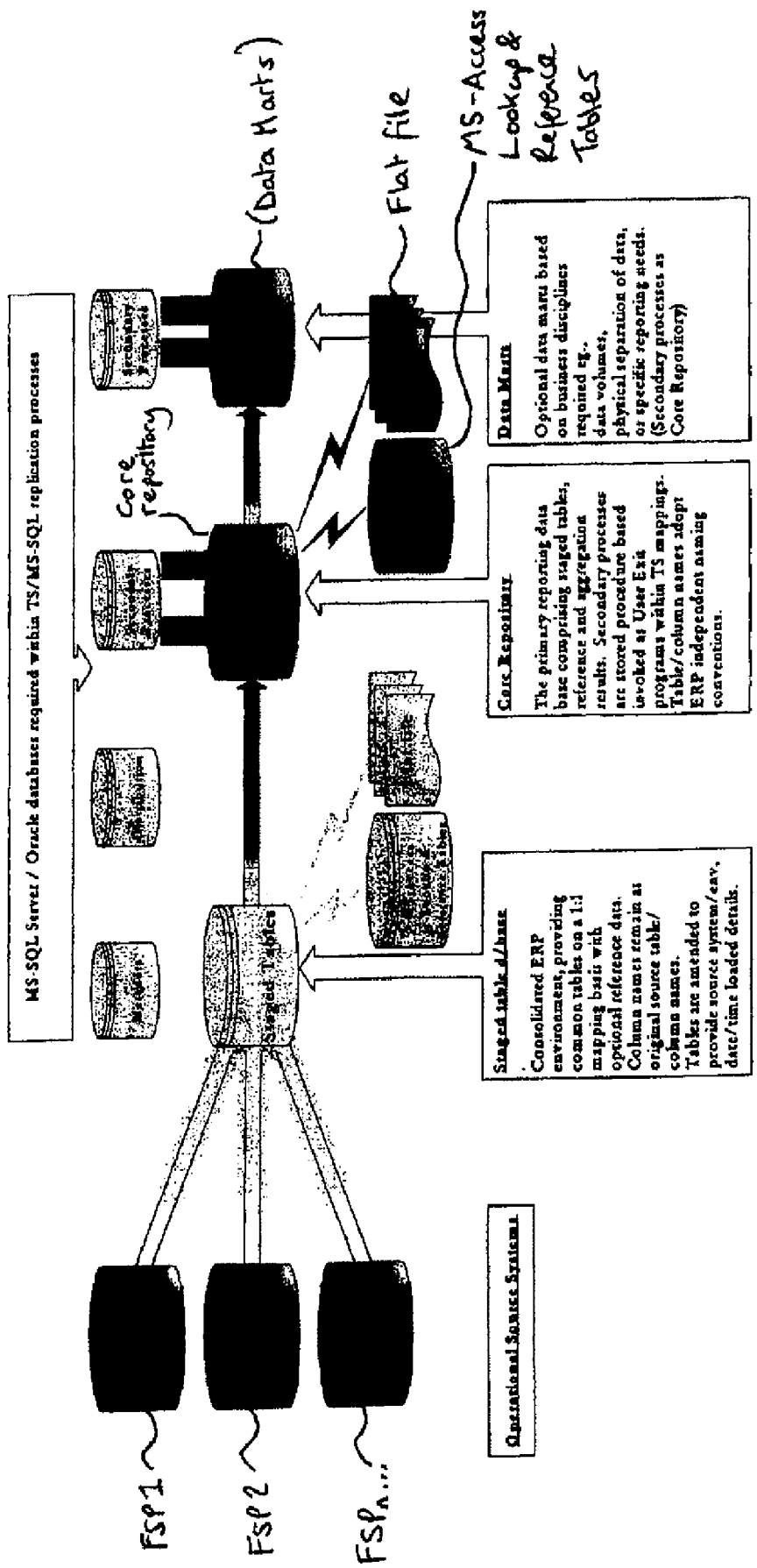
FIG. 5 is a schematic illustration of a system architecture for use in the computer system of FIG. 4.

Among those benefits and improvements that have been disclosed, other objects and advantages of this invention will become apparent from the following description taken in conjunction with the accompanying figures. The figures constitute a part of this specification and include illustrative embodiments of the present invention and illustrate various objects and features thereof.

DETAILED DESCRIPTION OF THE INVENTION

Detailed embodiments of the present invention are disclosed herein; however, it is to be understood that the disclosed embodiments are merely illustrative of the invention that may be embodied in various forms. In addition, each of the examples given in connection with the various embodiments of the invention are intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

Of note, the application contains material that is subject to copyright protection. The copyright owner has no objection to the facsimile reproduction by anyone of the copyrighted material, as it appears in the Patent and Trademark Office file or records, but otherwise reserves all copyright rights whatsoever In one embodiment of the present invention there is provided a method of measuring performance of an investment portfolio held by an investor, comprising: providing first information indicating how the investment portfolio has performed over one or more predetermined periods of time; and providing second information indicating how investment portfolios of the investor's peer group have performed (e.g., on average) over the predetermined period(s) of time.

In this way, a peer-based benchmark may be provided which allows an investor to gain a deeper insight into their investment portfolio's performance. For instance, the peer-based benchmark may allow an investor to see what impact their asset allocation (e.g., find selection) decisions have had on investment performance when compared with selections made by their peer group.

In this regard, the investor's peer group may be defined in various terms including, but not limited to: age, length of service, profession, job description, education level, income level, gender, industry sector, geographic location (e.g. home or office), marital status, number of dependents, and/or risk profile. For example (which example is intended to be illustrative and not restrictive), the investor's peer group may comprise investors having substantially the same age as the investor.

In another example (which example is intended to be illustrative and not restrictive), the investor's peer group may comprise investors having ages within 5 years of that of the investor. In another example (which example is intended to be illustrative and not restrictive), the investor's peer group may comprise investors having ages within 1 year of that of the investor. In another example (which example is intended to be illustrative and not restrictive), the investor's peer group may comprise investors within the same profession, of a similar age, and with an income that is within 20 percent of that of the investor. In another example (which example is intended to be illustrative and not restrictive), the investor's peer group may comprise investors who have the same or a very similar risk appetite as reflected in the completion of a consistent risk profiling questionnaire (which could form part of a service to the employees/clients). In this regard, it is noted that one of the problems of a convention financial system is that different advisers apply their own slightly different risk profiling techniques which do not provide a consistent diagnosis—an independent and consistent risk profiling according to the present invention may provide a number of benefits.

In another example (which example is intended to be illustrative and not restrictive), the second information may be broken down by performance group (e.g. into quartiles or other practical sub-divisions).

In another example (which example is intended to be illustrative and not restrictive), the second information may include an indication of the investor's relative position in the investor's peer group based on investment portfolio performance over the predetermined period(s) of time (this information may, if desired, be provided in the form of a percentile).

In another example (which example is intended to be illustrative and not restrictive), the second information may include an indication of how the investor's asset allocation compares to an average allocation in the investor's peer group. In one specific example (which example is intended to be illustrative and not restrictive), the second information may include an indication of how the investor's asset allocation compares to an average of a high-performing group within the investor's peer group (e.g. top quartile or other practical sub-division). In this way, an investor is able to identify to what degree asset allocation is responsible for any difference in performance from the peer group average (e.g. as a whole and quartile averages). Moreover, another basis of comparison may be how many funds/products the individual is holding compared to their peer group average and top quartile (this is relevant because individuals may find they are holding a high number of funds but generating no additional performance in which case they may be able reduce complexity without any adverse impact on returns—notwithstanding the importance of diversification).

In another example (which example is intended to be illustrative and not restrictive), the second information may include an indication of the average value of investment portfolios in the investor's peer group. In one specific example (which example is intended to be illustrative and not restrictive), the second information may include a figure which represents an average value of the investment portfolios in the investor's peer group. In another specific example (which example is intended to be illustrative and not restrictive), the second information may include a figure which represents an average value of the investment portfolios in a high-performing group (e.g. top quartile or other practical sub-division). In another specific example (which example is intended to be illustrative and not restrictive), the second information may include an indication of the investor's relative position in the investor's peer group based on investment portfolio value (this information may be provided in the form of a percentile). In another specific example (which example is intended to be illustrative and not restrictive), the information may include an indication of the investor's relative position in the investor's peer group based on the rate of savings contribution to his pension pot, either in absolute terms or as a percentage of salary.

As discussed herein, the present invention may provide a mechanism to assist an investor in a pension plan to usefully ascertain how their pension savings compare to those of their peer group (this analysis may extend, for example, to a comparison of the investor's rate of saving, both core and voluntary, as a proportion of their income, relative to their peer group).

Further, as discussed herein, the present invention may provide a mechanism to assist employers in understanding how the performance of their employees' pension pots compares with a broader population of individuals (e.g., employed by other companies) which may be considered similar along a number of dimensions including, but not limited to: size, industry sector and/or location. Moreover, additional observations for the employer may include a comparison of the distribution of individual total portfolio investment returns across the population of employees compared with the average and top quartile for a valid peer group—this would comprise a measure of the mean and standard deviation. Further metrics to benchmark across employers may be the plan cost and complexity—for example, if the employer sees that on average each of their employees is holding 10 funds versus a peer group average of 5, with no incremental return, there may be a significant opportunity to simplify the plan.

In another embodiment of the present invention a computer system for measuring performance of an investment portfolio held by an investor is provided, comprising: an investor performance database; a peer group performance database; and a performance report engine configured to provide first information indicating how the investment portfolio has performed over one or more predetermined periods of time (e.g., based on data obtained from the investor performance database), and provide second information indicating how investment portfolios of the investor's peer group have performed (e.g., on average) over the predetermined period(s) of time (e.g., based on data obtained from the peer group performance database).

In one example (which example is intended to be illustrative and not restrictive), the computer system may further comprise a data collection module connected to the peer group database, the data collection module being configured to obtain peer group information from sources such as, for example, existing databases.

In another example (which example is intended to be illustrative and not restrictive), the computer system may further comprise an input module connected to the investor performance database, the input module being configured to receive additional investor performance data.

Of course, the second information used in connection with a system may include any of the second information discussed above in connection with a method.

Referring now to FIG. 2, an example of information which may be provided (e.g., in place of or in addition to the conventional information provided in FIG. 1) in accordance with an embodiment of the present invention is shown. As seen in this Figure, the information provided may include (but not be limited to) the following categories of information: average (e.g. mean) peer group investment performance over the last twelve months; a percentile position indicating the investor's relative position in their peer group based on investment performance over the last twelve months; an average (e.g. mean) peer group pension pot value; a percentile position indicating the investor's relative position in their peer group based on pension pot value; and an indication (e.g., presented as a percentage deviation from the mean peer group value) of how the investor's asset allocation compares to average allocation for the top quartile of performers within the investor's peer group. Moreover, rate of saving and number of products held (complexity) may be further bases of comparison.

In the example provided in FIG. 2, the investor is 42 years old and a peer is defined as other investors between 41 and 43 years old (i.e. the peer group consists of investors having an age within one year of that of the investor). Of course, other ages and age spreads may be utilized (and age groups may be compounded with seniority levels to provide a more targeted peer group)

By providing peer group benchmarks, an investor can see more clearly what impact their asset allocation (e.g., fund selection) decisions have had on the overall picture. For example, whereas the information contained in the conventional performance statement shown in FIG. 1 indicates a performance of 0.25% above the benchmark, the information provided in FIG. 2 indicates that the investment performance is 1% below what the investor's average peer achieved. The information provided in FIG. 2 also allows an investor to see what decisions lay behind the difference in performance, i.e. that this particular investor was 15% underweight in their allocation to U.K. equities and 11% underweight in their allocation to real estate.

Of note, the calculation of the under/overweight may be determined by the difference between the proportion of the peer group's total pension pot invested in a particular asset class relative to the proportion of the investor's total pension pot invested in that same asset class.

Of further note, the inclusion of an average peer group pension pot value further allows an investor to see how their rate of saving compares with that of their peers. This information may provide the investor an additional reference point upon which to base future decisions (e.g., regarding saving for a pension versus alternative uses for their income). Of note, the rate of saving over the period under review may be critical because different individuals may have been in the corporate plan for different periods of time meaning that a comparison of the total "pot" size may not be particularly meaningful.

Referring now to FIG. 3, an example of information which may be provided (e.g., in place of or in addition to the conventional information provided in FIG. 1) in accordance with another embodiment of the present invention is shown. As seen in this Figure, the information provided may include (but not be limited to) the following categories of information: deviation from average (e.g. mean) peer group investment performance over the last twelve months; a percentile position indicating the investor's relative position in their peer group based on investment performance over the last twelve months; average (e.g. mean) peer group investment performance by quartile over the last twelve months; deviation from average (e.g. mean) peer group pension pot value; a percentile position indicating the investor's relative position in their peer group based on pension pot value; and an indication (e.g., presented as a percentage deviation from the mean peer group value) of how the investor's asset allocation compares to average allocation for the top quartile of performers within the investor's peer group.

In the example provided in FIG. 3, the investor is a young employee and a peer is defined as other young employee investors, In one example (which example is intended to be illustrative and not restrictive), a young employee may be between 20 and 30 years old. In another example (which example is intended to be illustrative and not restrictive), the peer group may consist of investors having an age within one year of that of the investor. Again, other ages and age spreads may, of course, be utilized.

By providing peer group benchmarks of the type shown in FIG. 3, an investor can see clearly what impact their asset allocation (i.e. fund selection) decisions have had on the overall picture. For example, whereas the information contained in the conventional performance statement shown in FIG. 1 indicates a performance of 0.25% above the benchmark, the information provided in FIG. 3 indicates that the investment performance is significantly below what the investor's average peer achieved. The information provided in FIG. 3 also allows an investor to see what decisions lay behind the difference in performance, i.e. that this particular investor was underweight in their allocation to equities and underweight in their allocation to hedge funds.

Of note, the calculation of the under/overweight may be determined by the difference between the proportion of the peer group's total pension pot invested in a particular asset class relative to the proportion of the individual's total pension pot invested in that same asset class.

Of further note, the variables "a", "b", "c", "d" and "e" in this FIG. 3 are, of course, intended to represent appropriate values which would be calculated based upon the underlying data.

Of further note, the inclusion of an average peer group pension pot value further allows an investor to see how their rate of saving compares with that of their peers. This information may provide the investor an additional reference point upon which to base future decisions (e.g., regarding saving for a pension versus alternative uses for their income).

Referring now to FIG. 4, it is noted that an investment report containing some or all of the information shown in FIGS. 1, 2 and/or 3 may be provided by a computer system. An example of such a computer system (which example is intended to be illustrative and not restrictive), is shown in FIG. 4. More particularly, computer system 10 may comprise: an investor performance database 20; a peer group performance database 30; and a performance report engine 40. The peer group database 30 may be assembled and updated by a data collection module 50 configured to access and extract relevant performance information from, for example, existing databases (e.g. via the internet using software based on a modification of existing business intelligence software). Once collected, the relevant information may be imported into the peer group database 30 of the computer system 10. In use, the performance report engine 40 may be configured to prepare a report for an investor using information obtained from both the investor performance database 20 and the peer group performance database 30.

In addition, the computer system 10 may include an input module 60 for receiving additional investor performance data. In one example (which example is intended to be illustrative and not restrictive), investors may be given the opportunity to supplement the service provided by the system by logging onto a website and entering financial information relating to accounts which are not part of the existing dataset stored on the investor performance database 20. In so doing, the performance report engine 40 may be able to provide an even more complete picture of how an investor's assets are performing relative to their peers. In another example (which example is intended to be illustrative and not restrictive), investors may elect to provide access to their accounts elsewhere and data may be imported using conventional software technology.

Of note, the various components of FIG. 4 are operatively connected via appropriate communication channels, which are not shown in the Figure.

Of further note, various input devices (e.g., keyboard, mouse), output devices (e.g., monitor, printer) and storage devices (e.g., magnetic hard drive, optical drive) may, of course, be utilized.

Referring now to FIG. 5, an example system architecture (which example is intended to be illustrative and not restrictive) for use in connection with computer system 10 is shown (this example system architecture may be based on a business intelligence architecture known in the art).

Figure 6:
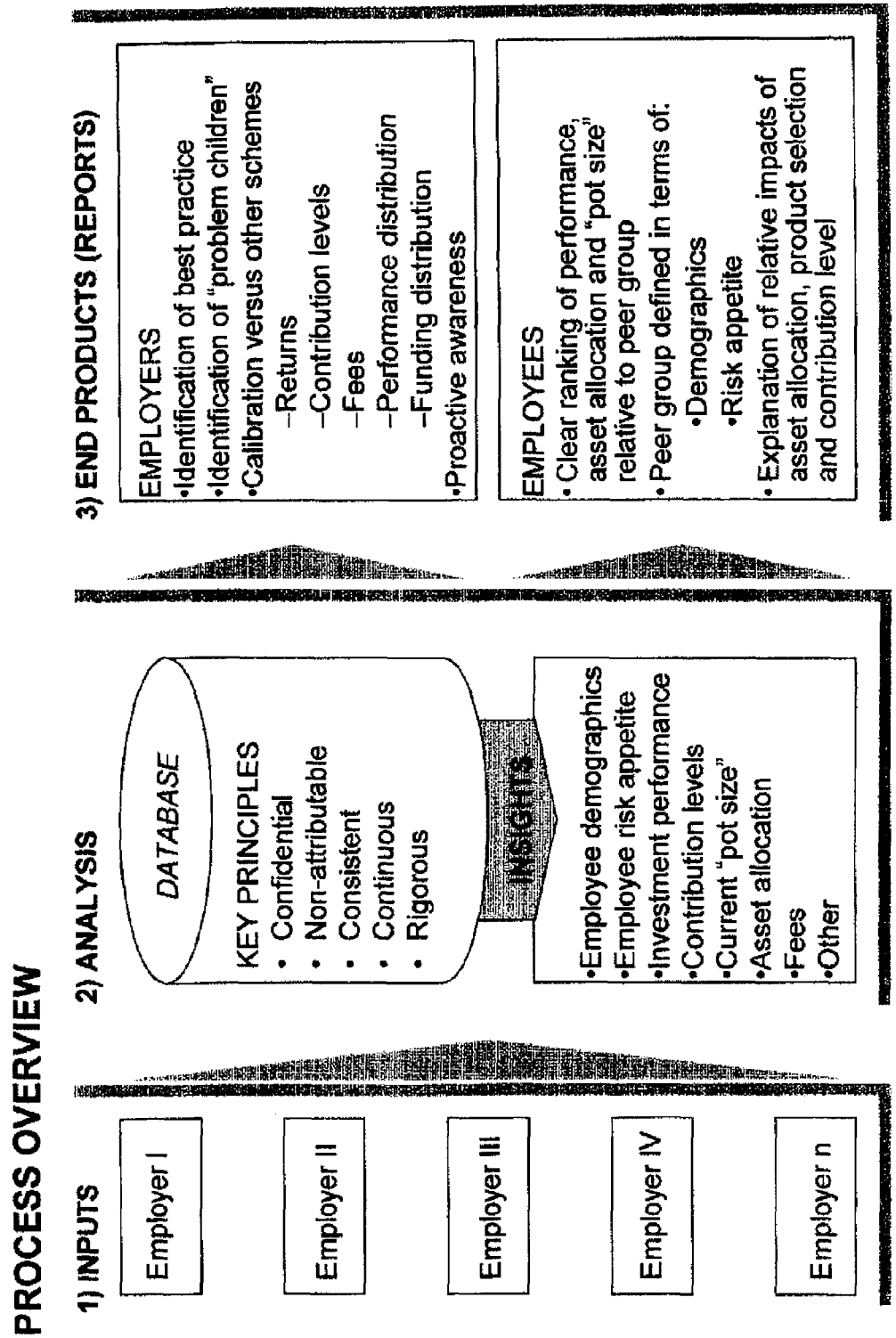
FIG. 6 is a process overview example of the present invention.

Referring now to FIG. 6, a process overview example is shown. As seen in this FIG. 6, inputs may come from a number of employers, an analysis of information stored in a database may provide a number of insights, and end products (e.g., in the form of reports) may be provided to employers and individual employees.

Referring now to FIG. 7, an example of output data for trustees and employers according to an embodiment of the present invention is shown. As seen in this FIG. 7, outputs may be utilized for employee performance tracking, contribution tracking, liability management and cost/benefit analysis.

Reference will now be made to certain risk management aspects of the present invention. In this regard, it is believed that under certain circumstances an employer may have a duty of care to ensure that a pension plan is run appropriately on behalf of employees. Further, it is believed that the possibility that employees will make bad decisions as a result of the autonomy they have in the selection of funds may carry with it potential liability for an employer.

Accordingly, various embodiments of the present invention may aid in the identification of employees who have made bad decisions regarding the allocation of their pension assets.

More particularly, various embodiments of the present invention may identify and flag to senior management those employees within the workforce who have generated poor investment returns over various pre-determined time periods, e.g., the past 1, 3 and 5 years (the specific hurdle may be set, for example, on an employer-by-employer basis and/or an employee-by employee basis (possibly categorized by employee type, level and/or age)).

In one example (which example is intended to be illustrative and not restrictive), the present invention may communicate (e.g., by e-mail or letter) proactively with those employees falling within this underperforming category (such communication may occur, for example, subsequent to receipt of permission from the employer). This communication may confirm that the employee is managing their pension assets in a sub-optimal manner, that a change of behavior is required (e.g. the person should meet with a financial adviser, adjust their asset allocation), and/or that if the present condition continues, the individual will have insufficient funds to provide for retirement. In causing such communication to be made (e.g., by operating a suitable system or having a suitable system operated by a third party), the employer will be on record as having identified the problem, and taken appropriate action to resolve it (thereby potentially reducing their vulnerability to subsequent legal action).

A further risk management aspect of the present invention relates to the rate of saving of individual employees. Again, a threshold may be set in conjunction with each individual employer (depending on their preferences) and/or categories of employees, relating to the minimum acceptable level of saving. For those employees falling below this threshold, a communication may be issued proactively to make the employee aware of the existing and growing shortfall in their retirement funds.

Reference will now be made to an example method according to the present invention (of course, this example is intended to be illustrative and not restrictive). More particularly, the example method may provide for: populating one or more databases with data from one or more data sources; interrogating the populated database(s) to determine and/or calculate various metrics; and reporting on the results of the interrogation.

Specific examples of data source(s) used to populate the database(s), data characteristics of the data, interrogation capabilities and reporting capabilities associated with the method may be as follows (again, of course, the following are intended to be illustrative and not restrictive):

Data sources: One or more databases may be populated with data which may be held by employers (e.g., corporate employers) and/or financial services providers (e.g., wholesale financial services providers). Each of these holders (e.g., employer/service provider) may, of course, have multiple employee/client records. The present invention may be utilized to extract data records for each underlying employee/client at discrete points in time (e.g., "today" (i.e., the current date) and at month end over each of the past five years. In each case, the reporting dates used for each employer/services provider may need to be the same (or otherwise harmonized). Further, additional data (e.g., from new employers/services providers) may be added to the existing data set at any time, without disruption to work in progress. In one example (which example is intended to be illustrative and not restrictive), the populated databases(s) may contain a subset of the information from the data source(s). That is, certain information (e.g., personally identifiable information such as name and address) which is available from a data source may remain confidential and not be used in the population of a database which is subject to interrogation and reporting. Each employee/client record (from the data source and/or as stored in a populated database) may carry demographic information and details of the financial product holdings of the employee/client. A specific example (which example is, of course, intended to be illustrative and not restrictive) of a record may be as follows (note that the financial products held may be in various different currencies, hence the example below covers dollar, euro, yen and sterling):

Details of employer/Financial services provider
Name
Date of birth
Sex
Date on which individual became an employee/client
Salary
Job grade
Product a: £ value, number of units held, categorization (e.g. cash, bond, UK equity, European equity, US equity, ROW equity, real estate, other)
Product b: $ value, number of units held, categorization (e.g. cash, bond, UK equity, European equity, US equity, ROW equity, real estate, other)
Product c: € value, number of units held, categorization (e.g. cash, bond, UK equity, European equity, US equity, ROW equity, real estate, other)
Product d: ¥ value, number of units held, categorization (e.g. cash, bond, UK equity, European equity, US equity, ROW equity, real estate, other)
Product n: £ value, number of units held, categorization (e.g. cash, bond, UK equity, European equity, US equity, ROW equity, real estate, other)
If any product switches took place on or between the observation dates, details of what was sold and what was purchased (value and number of units in each case), and the date(s) on which this took place
Details of any product purchases made on or between the observation dates, details of what was purchased (value and number of units in each case), and the date(s) on which this took place
Value of total product holdings split by tax vehicle:
  Wrapper a
  Wrapper b
  Wrapper n
There may also be performance data for the average of all products within each particular category (i.e. the asset class benchmark), which may be sourced separately.

Of note, there could be a high number of product holdings in each reporting period (e.g., each employer/services provider could have 20 or more products). Further, the type of product held by each customer is likely to change over the various years observed. Further still, the types of products held via each employer/services provider may be different (therefore the total number of different financial products held on the system could easily run into 1000 or more). While these products may fall into various product categories established at the outset, the system may maintain the flexibility to add additional categories in due course (e.g. emerging market equity), particularly as and when new employers/ services providers/employees/clients are recruited. Moreover, the system may take into account the fact that the currency in which the product is held may vary from product to product and/or from employee/client to employee/client.

Interrogating the Populated Database: Various embodiments of the present invention may facilitate calculation of the mean and standard deviation of key metrics (e.g., investment return, volatility, funding levels, savings rates etc.). These calculations may be possible for the entire population of employees/clients as a whole and/or for discrete sub-groups, such as defined in terms of various criteria including, but not limited to: age, sex, seniority, salary, sector within which they are employed, risk profile, type of products held, etc. In one specific example (which example is intended to be illustrative and not restrictive), such criteria may comprise all people between the ages of 30 and 32 or all people between the salary bands of x and y. Further, though it may be possible to anticipate from the outset the most likely analyses/queries that will be required, the present invention may also be capable of performing additional, ad hoc analysis/queries (e.g. along multiple dimensions that may not necessarily be specified at the outset). In order to facilitate this ad hoc analysis/query functionality, the various product types may need to be categorized consistently (e.g. across the range of employers/services providers).

Reporting on Results of Interrogation: In one example (which example is intended to be illustrative and not restrictive), there may be four primary audiences for the reports; 1) the employers; 2) the financial services providers; 3) the underlying employees/clients; and 4) third parties for whom customized reports will be prepared on an as needed basis. Of note, reports may be distributed, in one example, in an e-mail in PDF format.

Employers/Financial services providers: A typical reporting suite for each of these audience members may comprise analysis of the average product holdings of the employee base compared with the entire employee universe across all employers. Specific comparisons between the individual employer's employee base and the full employee universe may include (but not be limited to):

Average value of holdings per employee, standard deviation

Breakdown of average holdings by product categorization (e.g., cash, bonds, equities within various regions as outlined above etc), standard deviation Average performance of each employee's entire portfolio, standard deviation Distribution representative of individual total portfolio performance for each individual employee's entire portfolio Analysis of product breakdown, e.g., average split of products (and standard deviation) across the various product categories for the:

top quartile of employees in terms of total value of products held top quartile of employees in terms of portfolio performance Analysis of each product category's performance (e.g., average and standard deviation), compared with the same category's performance across the entire employee universe Analysis of the volume of new purchases, not switches (e.g., average and standard deviation) compared with the purchase patterns for the entire employee universe Analysis of the volume of product switches (e.g., average and standard deviation) compared with the switch patterns for the entire employee universe Analysis of the number of products held Of note, in addition to performing the above analyses for the employer's employee base as a whole, the same analysis may be stratified (e.g., in accordance with the employee's age, job grade and salary). In other words, there may be provided an ability to drill down into discrete segments within the population to develop a picture of how different groups behave and perform.

Each of the underlying employees: An individual report may be produced for each of these individuals; this report may provide a comparison of the individual's data with two elements of the broader customer population: 1) all employees with the same employer provider, 2) all employees in the entire universe. The information may be further segmented to provide analysis of the employee's data relative to a number of their discrete peer groups, e.g. all people between the ages of 40 and 43, all people with the same job description and within this same age group (i.e. a "compound" peer group). Specific analyses may include (but not be limited to) comparison of the employee's data along the following dimensions relative to that of the various comparator groups outlined above:

Total portfolio value

Total portfolio performance

Breakdown of portfolio into the various product categories

Performance of the individual product categories

Value of new product purchases

Number and value of switches made

Ranking within the various comparator groups in relation to portfolio value, portfolio performance Comparison of individual's performance and portfolio composition relative to the average for the first quartile In addition, the report may allow for a financial projection to be incorporated based on an algorithm applied to the data Of note, a standard risk profile questionnaire (e.g., available via web or hard copy) may be provided which underlying employees can elect to complete. This profiling may provide an additional method of categorization along the lines of "risk tolerance", and may therefore enable peer groups to be identified in terms of the risk appetite of the underlying individuals.

Of further note, the description outlined herein is principally written in the context of employers subscribing to a data sharing process in relation to their employees. This process also lends itself to data sharing amongst financial services providers in relation to their customers.

Ad hoc analysis for third parties: The precise nature of these reports may not be known in advance Basic: Easy to execute analysis of the database which can be packaged into a report. The analysis is likely to be highly detailed (e.g., analysis of distinct product holdings relative to competitor product holdings within the same category). Insights may include penetration levels of products and an analysis of the demographics of the population segment which holds the product in question; this "population profile" could then be compared to another "population profile" for customers who hold a competitor product.

Advanced: Access, such as via the internet, to an essentially duplicate set of the entire data universe, scrubbed to exclude any personal customer information. The website could facilitate interrogation along multiple dimensions, by virtue of an easy to use "front end".

Reference will now be made to an example of the present invention. Of note, this example will be discussed in connection with FIGS. 8 and 9. More particularly, the example (which example is intended to be illustrative and not restrictive) is as follows:

Populating Database and Categorizing Assets

Data regarding each individual investor may be pulled from a data source to populate a database. This data source may be that of a pensions administrator appointed by the sponsoring employer (in the case of an employer sponsored pension plan) or that of a trust company or a bank (in the case of general investment accounts). This data source may comprise demographic information relating to the individual as well as a description of each financial product held and details of the associated holding value.

In each case, there are an almost infinite number of financial products which each individual might hold. Prior to the population of the database, an investment specialist may review each and every financial product in the universe and categorize each into one of approximately 20 or fewer asset classes (e.g. Active European Equity, Passive US Equity, Hedge Funds, Local Currency Cash etc.). In this way the product holdings of each individual in the data universe can be represented in a simplified matrix comprising, for example, 20 or fewer investment categories (FIGS. 8A-1 through 8A-4 depict a spreadsheet entitled "Phase I" providing an overview of this extraction and translation process and FIGS. 8B-1 through 8B-4 depict a spreadsheet showing the formulas used in the spreadsheet of FIGS. 8A-1 through 8A-4). Product holding details may be extracted for various points in time (e.g. "today" (that is, the current date), one, three and five years ago) in order to facilitate performance analysis over select periods.

In one example, the spreadsheet example of FIG. 8 outlines typical data (as populated in the database) for one individual. However, it is understood that records for thousands of individuals may be obtained (although the core process may remain the same in all cases). Note also that in the example given, the data stretches back three years; in practice the data set may stretch back many more (or less) years and may be dependent on the records kept by the various entities with which the service will interface in order to extract the data.

Interrogating the Populated Database

Interrogating the populated database may comprise using demographic information relating to each individual to categorize the individuals into peer groups (e.g., defined in terms of various criteria which may be applied in isolation or in combination). These criteria may include (but are not limited to): age, length of service, profession, job grade/description, education level, salary, gender, industry sector, geographic location (e.g. home or office), marital status, number of dependents and/or risk profile (e.g., as determined by stochastic risk modeling which is well known in the art). Each peer group may then form a discrete data set which in turn may form the basis for further detailed analysis.

Figure 9B-2:
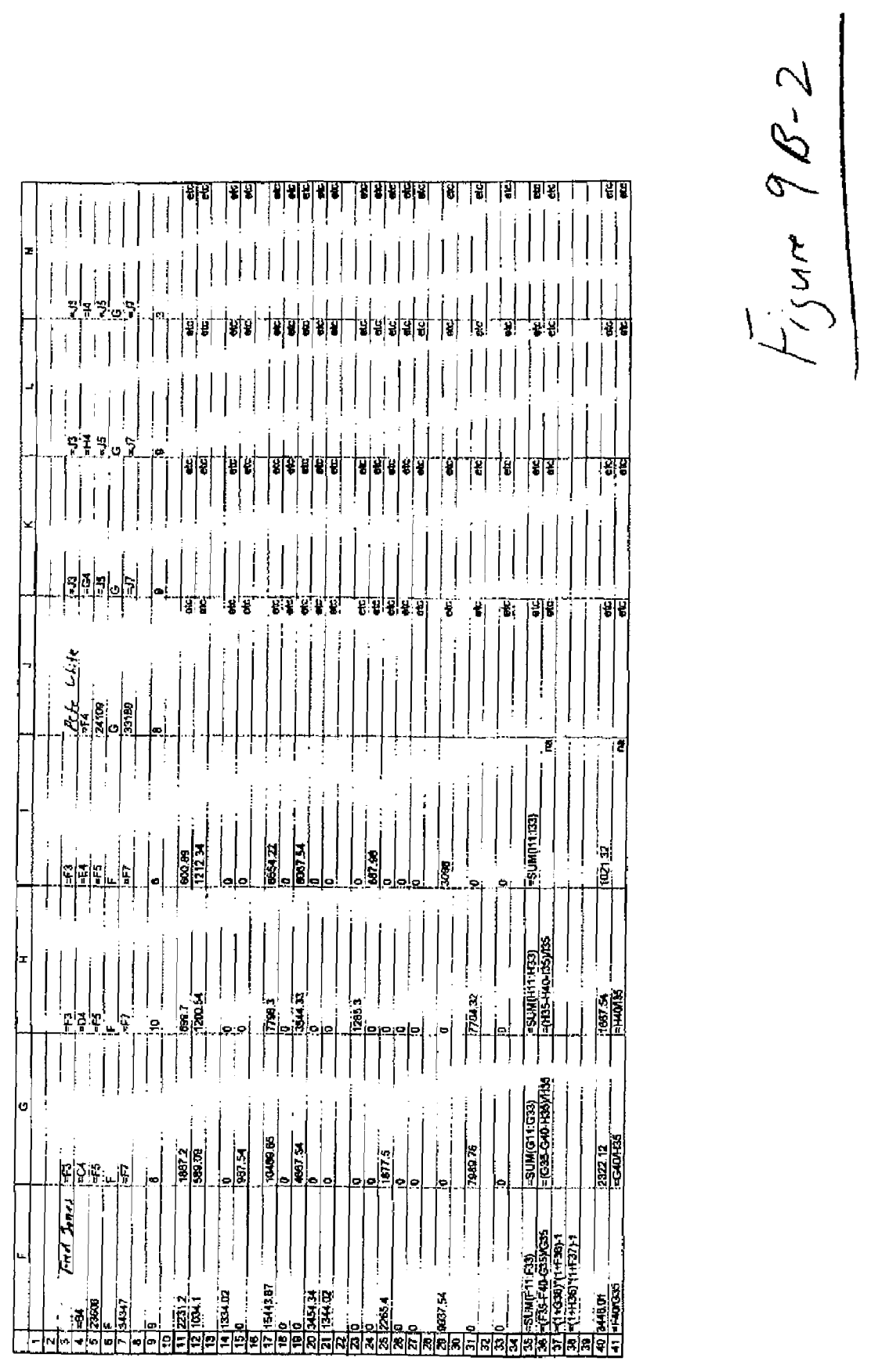

The example spreadsheet of FIG. 9 outlines a typical peer group showing each individual's demographic information, together with details of the account balances split by the major asset class categories (FIGS. 9A-1 and 9A-2 depict a spreadsheet entitled "Phase III" providing an overview of this analysis process and FIGS. 9B-1 and 9B-2 depict a spreadsheet showing the formulas used in the spreadsheet of FIGS. 9A-1 and 9A-2). By categorizing product holdings in this way, and aggregating individuals into clearly defined peer groups, determinations and/or calculations may be applied to large volumes of data in order to yield insights into relative performance and portfolio complexity (e.g., as represented by the number of products held).

Of course, it is the nature of individual behavior to perform switches between product holdings at essentially random intervals which in some cases may occur frequently throughout any given year. As a consequence of these switches, simplifying assumptions may be required in order to generate a representative picture of each individual's asset allocation for the period under review (e.g. the past year). One approach would be to calculate the asset allocation for the period as the average of the asset allocations represented by the opening and closing balances for the period under review.

Similarly, individuals may add or remove money to/from their accounts at essentially random intervals throughout any given year. It may be impractical to seek to attribute precisely the performance impact of these flows when determining or calculating in connection with high volumes of data (e.g. in relation to tens of thousands of individual retirement accounts, or thousands of accounts within a wealth management firm or trust company). Instead, an approximate performance measure may be derived by subtracting the inflow/outflow from the closing balance, and then calculating the performance over the period as implied by the closing balance net of this flow (this is outlined in the spreadsheet of FIG. 9).

Another measure of the average asset allocation over the period under review could result from the application of a money weighted average formula (which is well known in the art). This approach may be more practical in a case where the data warehousing technology facilitates the capture and integration of essentially each and every transaction and/or a record of the opening and closing balances for each business day of each year.

In any case, having the data in the format outlined in the spreadsheet of FIG. 9 enables the total portfolio performance i.e. the percentage increase/decrease in the total portfolio value of each individual to be compared and ranked. The average portfolio performance for the peer group as a whole may be calculated for various time cuts e.g. one, three and five years. Similarly, the top quartile by performance may be identified as a sub-set of the peer group and the average percentage return and asset allocation for this group may be calculated as a basis for comparison to each individual for whom information is held.

The spreadsheet also indicates that information may be captured in relation to the savings made by each individual. Again, this metric may form a basis for comparison, in terms of either or both of the absolute and percentage rates of saving (e.g., relative to the individual's salary level).

Note, of course, that once again the spreadsheet of FIG. 9 is a simplification of the reality as only three individuals are shown. In practice, data relating, for example, to thousands or tens of thousands of individuals may be used to populate the database (although key data items may remain consistent and the only practical difference may be the number of additional columns (and/or rows) that would contain data). Such expanded data may in fact be a prerequisite for calculation of various averages for each peer group as a whole, and for the subset of each peer group that represents the top quartile in terms of each particular metric under consideration.

Reporting on Results of Interrogation

Individual pension accounts. Individuals may receive reports comprising benchmarking of their total portfolio performance relative to their peers, both the average of the whole group and the average for the top quartile. Individuals may also receive reports comprising the average asset allocation of the total peer group, and the average asset allocation for the top quartile (defined in terms of the percentage return of their total portfolio) of the peer group. Further, employers may receive similar reports in relation to their universe of employees relative to a peer group of other similar employees (in one example, such reports may include both the mean portfolio return and standard deviation of portfolio returns for the employee populations). Finally, a report may identify for the employer those employees who are making sub-standard investment decisions, and who are generating poor investment returns as a consequence. Based on this report, the employer may take proactive steps to rectify the behavior of those employees in this category, thereby bolstering the employer's audit trail in discharging their duty of care to employees in relation to pension benefits.

Investment accounts administered by banks and trust companies. In one embodiment, various reports may assist banks and trust companies to monitor consistency in service delivered to groups of customers with similar needs. For example, this may extend to the identification of patterns in relation to consistent good or bad performance on the part of individual financial advisers within a particular institution, and in relation to institutions as a whole. In a more specific example (which example is intended to be illustrative and not restrictive), where a trust company appoints a bank on behalf of its client, the service may analyze the degree of consistency delivered by the various banks (and by the individuals responsible for account management within them).

As described above, various embodiments of the present invention may be used to: (1) help (for example) individuals within a scheme to obtain a better handle on how they are performing and what they can do to improve; and (2) help (for example) employers and trustees overseeing DC schemes to understand how well the scheme as a whole is performing and how this relates to its design features.

In one example of this second application, the measurement mechanism may be the distribution of total portfolio returns for each individual employee within the scheme (this data pooling process may be useful for the employers/trustees to understand how well (or not) their scheme has been designed and what might need changing).

Figure 10:
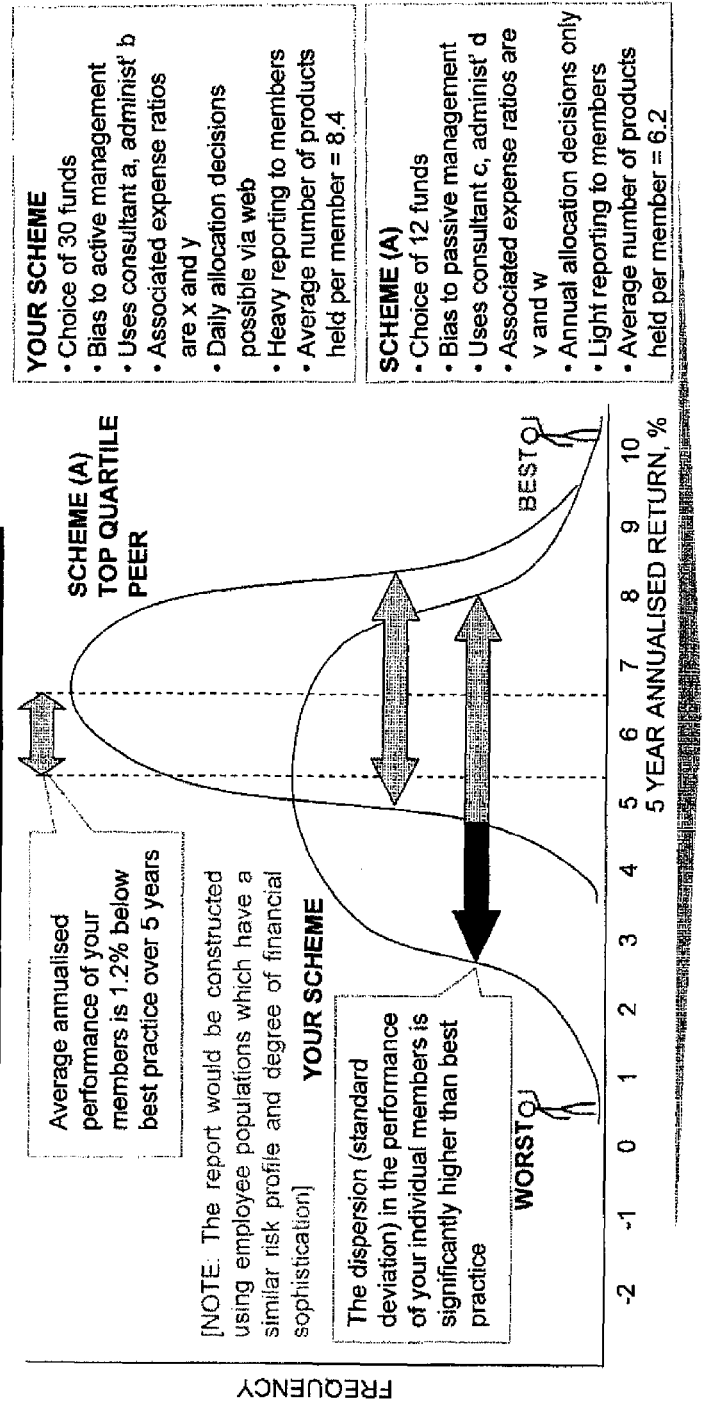
FIGS. 10 and 11 show example outputs for employees/trustees according to an embodiment of the present invention.
Figure 11:
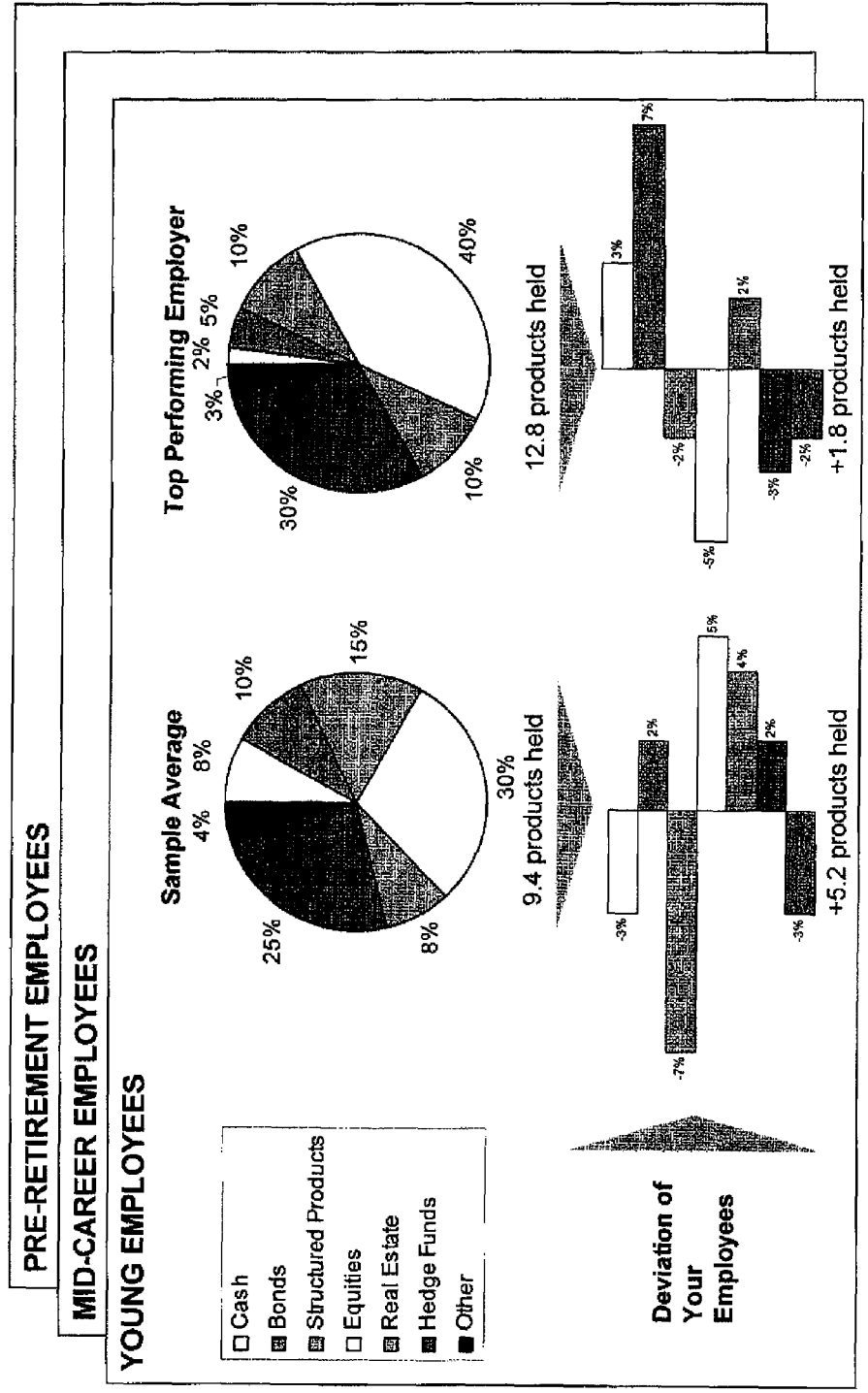
Figures 20, 21:

More particularly, the scheme level comparison according to this example may work by comparing one employer's distribution of total portfolio returns for each individual employee with a relevant peer group of other employers (ensuring a valid basis for comparison by stratifying by, for example, gender, age, job type and/or seniority)—one could then look at the features underlying each of the different schemes, e.g. number of find choices offered, asset class mix of this choice set, frequency, method and depth of communication, involvement of any particular investment consultants, administrators and other third party service providers, in order to assist the employer in identifying what attributes lie behind the best and worst performing schemes, and therefore in making decisions about the design of their scheme and selection of third party advisers/providers to support the process (in this regard, see FIGS. 10 and 11 for example outputs).

Of note, the distribution of this example may be a distinctive and appropriate method of measuring scheme performance because it is 'bottom up' taking account of each individual employee's portfolio return, rather than 'top down' looking at the aggregate value and performance of all funds in the scheme across all employees, which yields little insight into the consistency with which individual employees generate good results within the scheme or into the quality of decisions being made at the level of the individual employee. As an example, one might find that amongst the top performing schemes, there is a consistent feature of fewer funds offered, simpler scheme design and the recurrent appearance of one investment consultant who is clearly adding value because the schemes they are advising are consistently outperforming.

This distribution analysis according to this example may also (or instead) be used to look within a single employer's scheme, to identify different demographic groups who may be distinctive in terms of their ability to generate good results within the scheme. For example, support staff may perform worse than professional staff in an investment bank. By identifying these different segments, it will be possible to use different communication for these groups (for example using a simpler menu to communicate with the less sophisticated members), whilst still keeping the underlying fund and administration platform the same.

Another application of various embodiments of the present invention relates to the tracking of individual DC pension benefits as they move from company to company. For example, by taking a National Insurance/Social Security Number for individuals whose data is submitted by their employer, the service would be able to develop a unified view of each individual's pension benefits across all of the employers they have worked for. This may, for example, facilitate simplified communication (e.g., all employers could elect to report benefits to a single source (or a few sources) and that information may then be aggregated into a single report for the end client). In the case of private wealth management accounts, this may enable, for example, the calculation of share of wallet (i.e. how much of an individual's liquid wealth one advisory firm has versus another).

Reference will now be made to an example (which example is intended to be illustrative and not restrictive), of the manner in which data may be extracted from clients and structured in a relational database.

More particularly, under this example the population affected may be all persons holding a pension plan with a company at period start or period end date.

Further, in this example, the following protocols may need to be followed:

The data will be pipe-delimited in a UNICODE text file.

There will be multiple lines of data per member. The data should be grouped according to Record Type.

All data must be sent in one file. Data must be consolidated into a six monthly extract covering six discrete monthly periods, i.e. there will be a record submitted for each member on the first and last day of each calendar month over the six month period.

A negative symbol (−) should be at the beginning of negative values.

The default fund currency will be recorded in GBP (£). If the fund values are in a different currency, indicate so in the currency field so that the correct exchange rate can be applied. ISO 3-character currency codes must be used. If the fund currency is blank, GBP (£) will be the assumed currency of the fund.

All Fund Codes must be reported in the ISIN/SEDOL standardized codes.

Wherever a fund value is recorded, this should be quoted in the currency that appears in the corresponding currency field.

For data integrity checks, the format of the Payroll Number along with the file should be provided (e.g., If Payroll Number format is A12345, state that).

Data must be sent to a system operator via a secure server (FTP or intranet), e-mailed data will not be accepted.

All data should either be numeric or selected from the applicable list of abbreviations. The only two exceptions are:
Payroll number
Fund code Table 1 below identifies various record types according to this example (note that there may be multiple rows for certain record types):

TABLE 1

| Record Type | |
|---|---|
| Record Type | Description |
| 01 | Member Data |
| 02 | Fund Details—At Period Start Date |
| 03 | Fund Details—At Period End Date |
| 04 | Fund Details—During Period |

Table 2 below identifies various member data of Table 1 according to this example (note that one row of record type "01" data is provided for each member—this table should be captured each month under this example in order to enable the system operator to track changes in each individual's history):

TABLE 2

| Member Data | | |
|---|---|---|
| Fields | Format | Comments |
| Record Type | Char | Set to '01'. Denotes Member Data |
| Payroll Number | Char | |
| Date of Birth | DD/MM/YYYY | |
| Gender | Char | Set to 'F' if member is female, 'M' if member is male |
| Date Commenced Pensionable Service | DD/MM/YYYY | |
| Pensionable Salary | −9999999.99 | Annual Salary |
| Country Location | Char | ISO two letter code only |
| In-Country Location Code | Char | Refer to Appendix for acceptable entries |
| Active Status | Char | Set to 'Y' if an active employee, else set to 'N' if deferred employee. |
| Default Flag | Char | Set to 'Y' if member's main investment strategy is 'default', else set to 'N'. |
| Job Function | Char | Refer to Appendix for acceptable entries |
| Education Level | Char | Refer to Appendix for acceptable entries |
| Marital Status | Char | Set to 'S' if a member is single/divorced/widowed, else set to 'M'. |
| Number of Dependents | 99 | |
| Normal Retirement Date | DD/MM/YYYY | Expected retirement date of the employee based on information provided by the employee or national standards (Males—Age 65, Females—Age 60) |
| Period Start Date | DD/MM/YYYY | |
| Benefit Type | Char | Refer to Appendix for acceptable entries |
| Payroll Deduction Method | Char | Refer to Appendix for acceptable entries |

Table 3 below identifies various Fund Details—At Period Start Date of Table 1 according to this example (note that for each member one row of record type "02" data is provided for each fund at the start of each calendar month—a fund row will only be provided where the number of units held at the beginning of the period is greater than zero—all data with record type "02" is as of the beginning of the period, as denoted by the period start date field—all data in this table is cumulative):

TABLE 3

Fund Details—At Period Start Date

| Fields | Format | Comments |
|---|---|---|
| Record Type | Char | Set to "02". Denotes Fund Details Data at Period Start Date. |
| Payroll Number | Char | |
| Period Start Date | DD/MM/YYYY | |
| Fund Code | Char | |
| Total Units | −9999999.999 | |
| Total Fund Value | −9999999.99 | |
| Employer Units | −9999999.999 | |
| Employer Fund Value | −9999999.99 | |
| Employee Units | −9999999.999 | |
| Employee Fund Value | −9999999.99 | |
| Employee Additional Units | −9999999.999 | |
| Employee Additional Fund Value | −9999999.99 | |
| Employer Additional Units | −9999999.999 | |
| Employer Additional Fund Value | −9999999.99 | |
| Transfer In Units | −9999999.999 | |
| Transfer In Fund Value | −9999999.99 | |
| Other Units | −9999999.999 | |
| Other Fund Value | −9999999.99 | |
| Fund Currency | Char | Default is GBP |

Table 4 below identifies various Fund Details—At Period End Date of Table 1 according to this example (note that for each member one row of record type "03" data is provided for each fund at the end of each calendar month—a fund row will only be provided where the number of units held at the end of the period is greater than zero—all data with record type "03" is as of the end of the period, as denoted by the period end date field—all data in this table is cumulative):

TABLE 4

Fund Details—At Period End Date

| Fields | Format | Comments |
|---|---|---|
| Record Type | Char | Set to "03". Denotes Fund Details Data at Period End Date. |
| Payroll Number | Char | |
| Period End Date | DD/MM/YYYY | |
| Fund Code | Char | |
| Total Units | −9999999.999 | |
| Total Fund Value | −9999999.99 | |
| Employer Units | −9999999.999 | |
| Employer Fund Value | −9999999.99 | |
| Employee Units | −9999999.999 | |
| Employee Fund Value | −9999999.99 | |
| Employee Additional Units | −9999999.999 | |
| Employee Additional Fund Value | −9999999.99 | |
| Employer Additional Units | −9999999.999 | |
| Employer Additional Fund Value | −9999999.99 | |
| Transfer In Units | −9999999.999 | |
| Transfer In Fund Value | −9999999.99 | |
| Other Units | −9999999.999 | |
| Other Fund Value | −9999999.99 | |
| Fund Currency | Char | Default is GBP |

Table 5 below identifies various Fund Details—During Period of Table 1 according to this example (note that for each member one row of record type "04" data is provided for each fund for each calendar month—a fund row will only be provided where the number of units held at the beginning of the period or end of the period is greater than zero—all data with record type "04" is between the beginning and the end of the period (i.e., during the period), as denoted by the period start date and period end date fields—all data in this table is periodic (all values should reflect only the activity that occurred between the period start date and period end date)—all unit and monetary amounts should relate to actual fund transactions in the period, NOT payroll deductions or other accounting flows which precede the actual fund transaction):

TABLE 5

Fund Details—During Period

| Fields | Format | Comments |
|---|---|---|
| Record Type | Char | Set to "04". Denotes Fund Details Data during Period. |
| Payroll Number | Char | |
| Period Start Date | DD/MM/YYYY | |
| Period End Date | DD/MM/YYYY | |
| Fund Code | Char | |
| Employer Units Purchased in Period | −9999999.999 | |
| Employer Fund Value Purchased in Period | −9999999.99 | Monetary value of transaction |
| Employee Units Purchased in Period | −9999999.999 | |
| Employee Fund Value Purchased in Period | −9999999.99 | Monetary value of transaction |
| Date of Contribution Purchase | DD/MM/YYYY | Date of fund purchase, not payroll deduction |
| Employer Additional Units Purchased in Period | −9999999.999 | |

TABLE 5-continued

Fund Details—During Period

| Fields | Format | Comments |
|---|---|---|
| Employer Additional Fund Value Purchased in Period | –9999999.99 | Monetary value of transaction |
| Employee Additional Units Purchased in Period | –9999999.999 | |
| Employee Additional Fund Value Purchased in Period | –9999999.99 | Monetary value of transaction |
| Date of Additional Contribution Purchase | DD/MM/YYYY | Date of fund purchase, not payroll deduction |
| Transfer In Units Purchased in Period | –9999999.999 | |
| Transfer In Fund Value Purchased in Period | –9999999.99 | Monetary value of transaction |
| Date of Transfer In Purchase | DD/MM/YYYY | Date of fund purchase |
| Other Units Purchased in Period | –9999999.999 | |
| Other Contributions Fund Value Purchased in Period | –9999999.99 | Monetary value of transaction |
| Date of Other Contributions Purchase | DD/MM/YYYY | Date of fund purchase |
| Total Units Switched/Realigned | –9999999.999 | |
| Total Fund Value Switched/Realigned | –9999999.999 | |
| Total Units Bought | –9999999.999 | |
| Total Fund Value Bought | –9999999.999 | |
| Total Units Sold | –9999999.999 | |
| Total Fund Value Sold | –9999999.999 | |
| Fund Currency | Char | Default is GBP |

Tables 6-10 below identify various additional features according to this example:

TABLE 6

Acceptable Entries for In-Country Location Code

| Entry | Description |
|---|---|
| LHO | Head Office |
| LNR | Northern Region |
| LER | Eastern Region |
| LSR | Southern Region |
| LWR | Western Region |
| LHW | Home Worker |
| LOT | Other |

TABLE 7

Acceptable Entries for Job Function Field

| Entry | Description |
|---|---|
| JSM | Senior Management |
| JMM | Middle Management |
| JJM | Junior Management |
| JSS | Support Staff—secretarial and other administrative support staff |
| JMW | Manual Worker |
| JOT | Other |

TABLE 8

Acceptable Entries for Educational Level Field

| Entry | Description |
|---|---|
| ESE | Finished secondary school but no further qualifications |
| EUN | Obtained a bachelor's degree (includes Bachelor in Science/Arts) but no further qualifications |
| EGR | Obtained a graduate degree (includes MBA, Master in Science/Arts, JD, MD, PhD) |

TABLE 9

Acceptable Entries for Benefits Field

| Entry | Description |
|---|---|
| DCO | Defined Contribution Only |
| HYB | Hybrid |
| OTH | Other |

TABLE 10

Acceptable Entries for Payroll Deduction Method Field

| Entry | Description |
|---|---|
| SS | Salary Sacrifice |
| PD | Payroll Deduction |
| OTH | Other |

Reference will now be made to an example (which example is intended to be illustrative and not restrictive), of the manner in which calculation protocols may be applied to the data in order to generate insight.

Of note, under this example the calculation definitions may include:

Fund: Every record indicates a separate fund per employee. Where Level=Fund, calculations must be within one record.

Port: 'Port' is 'Portfolio' abbreviated. All funds across one employee indicate a portfolio. Where Level=Port, calculations must be across all records (or funds) for one employee (indicated by Payroll Number).

Applicable Exchange Rate: The Applicable Exchange rate is based on the Fund Currency Field. If the Fund Currency is not GBP, then the applicable exchange rate is the local currency's exchange rate in GBP.

Referring now more particularly to an Investment Return Calculation under this example, it is noted that required fields may include:

At Period Start Date: Record Type (02) discussed above

Total Fund Value

Fund Currency**

At Period End Date: Record Type (03) discussed above

Total Fund Value

Fund Currency**

During Period: Record Type (04) discussed above

Employee Fund Value Purchased in Period

Employer Fund Value Purchased in Period

Date of Contribution Purchase*

Employee Additional Fund Value Purchased in Period

Employer Additional Fund Value Purchased in Period

Transfer In Fund Value Purchased in Period

Date of Transfer In Purchase

Other Contributions Fund Value Purchased in Period

Date of Other Contributions Purchase

Fund Currency**

*Both Employer/Employee Fund Value Purchased in Period and Employer/Employee Additional Fund Value Purchased in Period are assumed to occur on the same date (Date of Contribution Purchase) provided they are in the same fund.

**Fund Currency is used to calculate the Applicable Exchange Rate.

Figure 12:
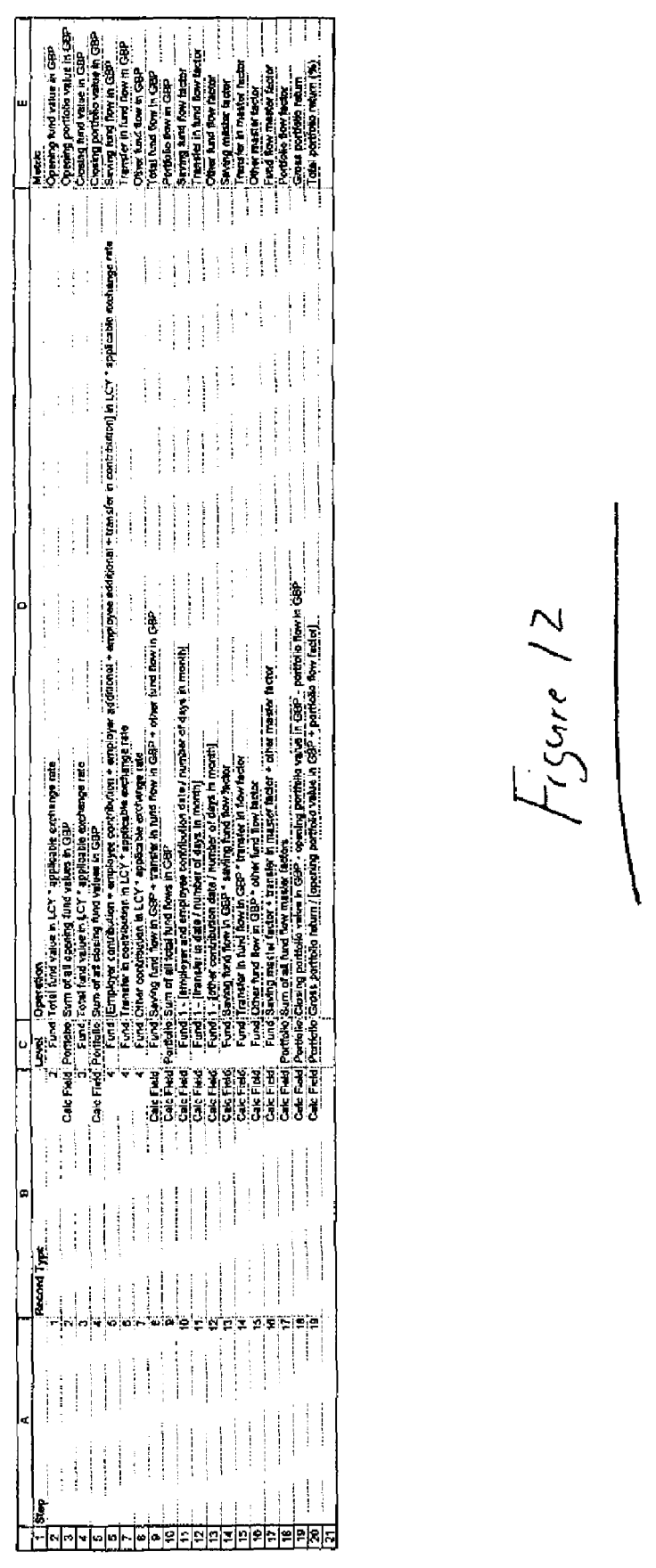

Table 11 below identifies various Investment Return Calculations (see also, FIG. 12) according to this example (note that these calculations are performed for each month, not across the entire investment period (i.e., provide monthly investment returns, not total)):

TABLE 11

Investment Return Calculations

| Step | Record Type | Level | New Variable | Fields | Operator |
|---|---|---|---|---|---|
| 1 | 2 | Fund | Opening Fund Value in GBP | Total Fund Value (at Period Start Date) Applicable Exchange Rate | * |
| 2 | Calc | Port | Opening Portfolio Value in GBP | Sum of Opening Fund Value in GBP | + |
| 3 | 3 | Fund | Closing Fund Value in GBP | Total Fund Value (at Period End Date) Applicable Exchange Rate | * |
| 4 | Calc | Port | Closing Portfolio Value in GBP | Sum of Closing Fund Value in GBP | + |
| 5 | 4 | Fund | Savings Fund Flow in GBP | (Employee Fund Value Purchased in Period | + |
| | | | | Employer Fund Value Purchased in Period | + |
| | | | | Employee Additional Fund Value Purchased in Period | + |
| | | | | Employer Additional Fund Value Purchased in Period) Applicable Exchange Rate | * |
| 6 | 4 | Fund | Transfer in Fund Flow in GBP | Transfer In Fund Value Purchased in Period Applicable Exchange Rate | * |
| 7 | 4 | Fund | Other Fund Flow in GBP | Other Contributions Fund Value Purchased in Period Applicable Exchange Rate | * |
| 8 | Calc | Fund | Total Fund Flow in GBP | Savings Fund Flow in GBP | + |
| | | | | Transfer in Fund Flow in GBP | + |
| | | | | Other Fund Flow in GBP | |
| 9 | Calc | Port | Gross Portfolio Flow in GBP | Sum of Total Fund Flow in GBP | + |
| 10 | Calc | Fund | Saving Fund Flow Factor | 1 | − |
| | | | | (Day of Date of Contribution Purchase | / |
| | | | | Number of Days in Month) | |

TABLE 11-continued

Investment Return Calculations

| Step | Record Type | Level | New Variable | Fields | Operator |
|---|---|---|---|---|---|
| 11 | Calc | Fund | Transfer In Fund Flow Factor | 1 | − |
| | | | | (Day of Date of Transfer In Purchase Number of Days in Month) | / |
| 12 | Calc | Fund | Other Fund Flow Factor | 1 | − |
| | | | | (Day of Date of Other Contributions Purchase Number of Days in Month) | / |
| 13 | Calc | Fund | Savings Master Factor | Savings Fund Flow in GBP | * |
| | | | | Savings Fund Flow Factor | |
| 14 | Calc | Fund | Transfer In Master Factor | Transfer In Fund Flow in GBP | * |
| | | | | Transfer In Fund Flow Factor | |
| 15 | Calc | Fund | Other Master Factor | Other Fund Flow in GBP | * |
| | | | | Other Fund Flow Factor | |
| 16 | Calc | Fund | Fund Flow Master Factor | Savings Master Factor | + |
| | | | | Transfer In Master Factor | + |
| | | | | Other Master Factor | |
| 17 | Calc | Port | Portfolio Flow in GBP | Sum of Fund Flow Master Factor | + |
| 18 | Calc | Port | Gross Portfolio Return | Closing Portfolio Value in GBP | − |
| | | | | Opening Portfolio Value in GBP | − |
| | | | | Gross Portfolio Flow in GBP | |
| 19 | Calc | Port | Total Portfolio Return | Gross Portfolio Return | / |
| | | | | (Opening Portfolio Value in GBP Portfolio Flow in GBP) | + |

Referring now more particularly to a Voluntary Contribution Calculation under this example, it is noted that required fields may include:

Member Data: Record Type (01) discussed above

Pensionable Salary

At Period End Date: Record Type (04) discussed above

Employee Fund Value Purchased in Period

Employee Additional Fund Value Purchased in Period

Employer Fund Value Purchased in Period

Employer Fund Value Purchased in Period

Fund Currency*

*Fund Currency is used to calculate the Applicable Exchange Rate.

Table 12 below identifies various Voluntary Contribution Calculations (see also, FIG. 13) according to this example:

TABLE 12

Voluntary Contribution Calculations

| Step | Record Type | Level | New Variable | Fields | Operator |
|---|---|---|---|---|---|
| 1 | 4 | Fund | Core Employee Fund Savings in GBP | Employee Fund Value Purchased in Period | * |
| | | | | Applicable Exchange Rate | |
| 2 | 4 | Fund | Voluntary Employee Fund Savings in GBP | Employee Fund Value Purchased in Period | * |
| | | | | Applicable Exchange Rate | |

TABLE 12-continued

| | | | Voluntary Contribution Calculations | | |
|---|---|---|---|---|---|
| Step | Record Type | Level | New Variable | Fields | Operator |
| 3 | Calc | Port | Core Employee Portfolio Savings in GBP | Sum of Core Employee Funds Savings in GBP | + |
| 4 | Calc | Port | Voluntary Employee Portfolio Savings in GBP | Sum of Voluntary Employee Fund Savings in GBP | + |
| 5 | 4 | Fund | Core Employer Fund Savings in GBP | Employer Fund Value Purchased in Period Applicable Exchange Rate | * |
| 6 | 4 | Fund | Voluntary Employer Fund Savings in GBP | Employer Fund Value Purchased in Period<br><br>Applicable Exchange Rate | * |
| 7 | Calc | Port | Core Employer Portfolio Savings in GBP | Sum of Core Employer Fund Savings in GBP | + |
| 8 | Calc | Port | Voluntary Employer Portfolio Savings in GBP | Sum of Voluntary Employer Fund Savings in GBP | + |
| 9 | Calc | Port | Monthly Core Employee Savings Rate | Core Employee Portfolio Savings in GBP<br>Pensionable Salary | / |
| 10 | Calc | Port | Monthly Voluntary Employee Savings Rate | Voluntary Employee Portfolio Savings in GBP<br>Pensionable Salary | / |
| 11 | Calc | Port | Monthly Core Employer Savings Rate | Core Employer Portfolio Savings in GBP<br>Pensionable Salary | / |
| 12 | Calc | Port | Monthly Voluntary Employer Savings Rate | Voluntary Employer Portfolio Savings in GBP<br>Pensionable Salary | / |
| 13 | Calc | Port | Monthly Total Employee Savings Rate | Monthly Core Employee Savings Rate<br><br>Monthly Voluntary Employee Savings Rate | + |
| 14 | Calc | Port | Monthly Total Employer Savings Rate | Monthly Core Employer Savings Rate<br><br>Monthly Voluntary Employer Savings Rate | + |
| 15 | Calc | Port | Monthly Core Contribution Rate | Monthly Core Employee Savings Rate<br>Monthly Core Employer Savings Rate | + |
| 16 | Calc | Port | Monthly Voluntary Contribution Rate | Monthly Voluntary Employee Savings Rate<br>Monthly Voluntary Employer Savings Rate | + |

Referring now more particularly to an Asset Allocation—Stock Calculation under this example, it is noted that required fields may include:

At Period End Date: Record Type (03) discussed above

Fund Code

Total Fund Value

Table 13 below identifies various Asset Allocation—Stock Calculations (see also, FIG. 14) according to this example (note that fund codes will be grouped into the following categories):

TABLE 13

Asset Allocation—Stock Calculations

| Asset Class | Sub-Category 1 | Sub-Category 2 | Sub-Category 3 |
|---|---|---|---|
| Cash | | | |
| Bonds | | | |
| Equity | Europe | Ex-UK | Small Cap |
| | Europe | UK | |
| | Asia | Japan | |
| | Asia | Ex-Japan | |
| | North America | | |
| | Emerging Markets | | |
| Hedge Funds | | | |
| Structured Products | | | |
| Real Estate | | | |
| Other | | | |

Next, within each category, summarize the data as follows in Table 14:

TABLE 14

Summarizing Data

| Step | Record Type | Level | New Variable | Fields | Operator |
|---|---|---|---|---|---|
| 1 | 3 | Fund | Closing Fund Value in GBP | Total Fund Value (at Period End Date) Applicable Exchange Rate | * |
| 2 | Calc | Port | Closing Portfolio Value in GBP | Sum of Closing Fund Value in GBP | + |

Note, that Steps 1 & 2 are pulled from Steps 3 & 4 related to the Investment Return Calculation discussed above.

Of further note, each category should also be represented as a percentage of the total fund categories.

Referring now more particularly to an Asset Allocation—Flow Calculation under this example, it is noted that required fields may include:

During Period: Record Type (04) discussed above

Fund Code

Employer Fund Value Purchased

Employee Fund Value Purchased

Employer Additional Fund Value Purchased

Employee Additional Fund Value Purchased

Table 15 below identifies various Asset Allocation—Flow Calculations according to this example (note that fund codes will be grouped into the following categories):

TABLE 15

Asset Allocation—Flow Calculations

| Asset Class | Sub-Category 1 | Sub-Category 2 | Sub-Category 3 |
|---|---|---|---|
| Cash | | | |
| Bonds | | | |
| Equity | Europe | Ex-UK | Small Cap |
| | Europe | UK | |
| | Asia | Japan | |
| | Asia | Ex-Japan | |
| | North America | | |
| | Emerging Markets | | |
| Hedge Funds | | | |
| Structured Products | | | |
| Real Estate | | | |
| Other | | | |

Next, within each category, summarize the data as follows in Table 16:

TABLE 16

Summarizing Data

| Step | Record Type | Level | New Variable | Fields | Operator |
|---|---|---|---|---|---|
| 1 | 4 | Fund | Savings Fund Flow in GBP | (Employer Fund Value Purchased | + |
| | | | | Employee Fund Value Purchased | + |
| | | | | Employer Additional Fund Value Purchased | + |
| | | | | Employee Additional Fund Value Purchased) Applicable Exchange Rate | * |
| 2 | Calc | Port | Savings Portfolio Value in GBP | Savings Fund Flow in GBP | + |

Note, that Step 1 is pulled from Step 5 related to the Investment Return Calculation discussed above.

Of further note, each category should also be represented as a percentage of the total fund categories.

Referring now more particularly to a Number Of Products Held Calculation under this example, it is noted that required fields may include:

At Period End: Record Type (03) discussed above

Fund Code

Table 17 below identifies various Number Of Products Held Calculations (see also, FIG. 15) according to this example (note that a count of the number of products per Payroll Number per period will be categorized into the following asset classes—the number of products must be summed for each asset class and for the overall portfolio—see discussion below for a detailed fund code categorization):

TABLE 17

Number Of Product Held Calculations

Asset Class
    Cash
    Bonds
    Equity
    Hedge Funds
    Structured Products
    Real Estate
    Other Referring now more particularly to a Number Switches Calculation under this example, it is noted that required fields may include:

During Period: Record Type (04)

Total Units Switched/Realigned

Table 18 below identifies various Number Of Switches Calculations according to this example:

TABLE 18

Number Switches Calculations

| Step | Record Type | Level | New Variable | Fields | Operator |
|---|---|---|---|---|---|
| 1 | 4 | Fund | Fund Switch In | Count 1 for each positive value of Total Units Switched/Realigned | Count |
| 2 | Calc | Port | Total Number of Fund Switches In | Sum of Fund Switch In | + |
| 3 | 4 | Fund | Fund Switch Out | Count 1 for each negative value of Total Units Switched/Realigned | Count |
| 4 | Calc | Port | Total Number of Fund Switches Out | Sum of Fund Switch Out | + |

Referring now more particularly to a Reporting segments under this example, it is noted that the data may be segmented by the following parameters (including, but not limited to):

Default/Not Default

Age

Salary

Years of Service

Portfolio Value

Number of Products

Switch Activity

Referring now to FIG. 16, another example of categorization of funds into consistent asset classes is shown.

Referring now to FIGS. 17-24, additional examples of sample outputs according to various embodiments of the present invention are shown.

Referring now to Table 19 below, various Fund Code Asset Classes under an example of the present invention are shown:

TABLE 19

Fund Code Asset Classes

| Fund Code | Asset Class | Currency | Sub-Category 1 | Sub-Category 2 |
|---|---|---|---|---|
| A | Cash | GBP | | |
| B | Bonds | GBP | | |
| C | Equity | GBP | Europe—Ex-UK | |
| D | Bonds | GBP | Europe—UK | |
| F | Equity | GBP | Global | |
| E | Equity | GBP | Europe—UK | Small Cap |
| G | Equity | GBP | Europe—UK | |
| H | Equity | GBP | North America | |
| I | Equity | GBP | Asia—Ex-Japan | |
| J | Equity | GBP | Emerging Markets | |
| K | Equity | GBP | Asia—Japan | |
| L | Bonds | GBP | | |
| M | Equity | GBP | Europe—Ex-UK | |
| N | Equity | GBP | Asia—Japan | |
| O | Equity | GBP | Asia—Ex-Japan | |
| P | Small Cap Equity | GBP | Europe—UK | Small Cap |
| Q | Equity | GBP | Europe—UK | |
| R | Equity | GBP | North America | |
| S | Equity | GBP | Emerging Markets | |
| T | Equity | GBP | Emerging Markets | |
| U | Hedge Funds | GBP | | |
| V | Hedge Funds | GBP | | |
| W | Structured Products | GBP | | |
| X | Structured Products | GBP | | |
| Y | Hedge Funds | GBP | | |
| Z | Hedge Funds | GBP | | |
| AA | Bonds | GBP | | |
| AB | Bonds | GBP | | |
| AC | Cash | GBP | | |
| AD | Multi | GBP | | |
| AE | Equity | GBP | Emerging Markets | |
| AF | | GBP | | |
| AG | Cash | GBP | | |
| AH | Cash | GBP | | |
| AI | Cash | GBP | | |

In another embodiment, the present invention may utilize the following definitions:

Employee/r Units—Includes core units for employee/r only. Does not include voluntary contribution.

Employee/r Fund Value—Includes core find value for employee/r only. Does not include voluntary contribution.

Fund Currency—All numeric fund values should be reported in the designated fund currency, as shown in this field.

Other—Includes bonus payments for joining executives and redundancy payments. Should not occur often in the file.

Transfer—The amount of money or units injected as a result of the migration of pension arrangements from a previous employer to the current employer's plan.

Units Switched—Indicates how many units are switched in (+) or switched out (−) of a fund.

Units Sold—Does not have a corresponding purchase, as in the case of a switch.

In another embodiment a system for measuring investment performance is provided, comprising: a mechanism which receives data regarding a total content of a first investment portfolio held by a first individual investor; a mechanism which assigns each of the investments in the first investment portfolio to one of a plurality of asset classes; a mechanism which receives, for each of a plurality of other investment portfolios, data regarding a total content of each of the other investment portfolios, wherein each of the other investment portfolios is held by a respective one of a plurality of other individual investors; a mechanism which assigns each of the investments in the other investment portfolios to one of a plurality of asset classes; a mechanism which selects as a peer group of the first investor a subset of the other investors, wherein the selection of the peer group of the first investor is based at least in part upon at least one characteristic of the first investor, and wherein the characteristic of the first investor upon which the selection of the peer group is based is selected from the group including at least one of: (a) an age of the first investor; (b) a profession of the first investor; (c) an industry sector in which the first investor is employed (d) a job description of the first investor; (e) an education level of the first investor; (f) an income level of the first investor; (g) an amount of money that the first investor has invested in a defined contribution retirement plan; (h) a length of service of the first investor; (i) a gender of the first investor; (j) a marital status of the first investor; (k) a number of family dependents that the first investor has; (l) location; and (m) rate of savings; a mechanism which determines total portfolio performance of the first investment portfolio based at least in part upon the associated content; a mechanism which determines total portfolio performance of each of the other investment portfolios held by the other investors in the peer group based at least in part upon respective associated content; a mechanism which compares the total portfolio performance of the first investment portfolio to the total portfolio performance of the other investment portfolios held by the other investors in the peer group to generate data indicative of a relative performance of the first investment portfolio; a mechanism which compares the asset class composition of the first investment portfolio to the asset class composition of the other investment portfolios held by the other investors in the peer group to generate asset class deviation data indicative of a deviation in asset class composition between the first investment portfolio and the other investment portfolios held by the other investors in the peer group; and a mechanism which outputs the relative performance data and the asset class deviation data.

In one example (which example is intended to be illustrative and not restrictive), the mechanism which receives data regarding a content of a first investment portfolio held by a first investor may comprise at least one of computer software and computer hardware.

In another example (which example is intended to be illustrative and not restrictive), the mechanism which assigns each of the investments in the first investment portfolio to one of a plurality of asset classes may comprise at least one of computer software and computer hardware.

In another example (which example is intended to be illustrative and not restrictive), the mechanism which receives, for each of a plurality of other investment portfolios, data regarding a content of each of the other investment portfolios may comprise at least one of computer software and computer hardware.

In another example (which example is intended to be illustrative and not restrictive), the mechanism which assigns each of the investments in the other investment portfolios to one of a plurality of asset classes may comprise at least one of computer software and computer hardware.

In another example (which example is intended to be illustrative and not restrictive), the mechanism which selects as a peer group of the first investor a subset of the other investors may comprise at least one of computer software and computer hardware.

In another example (which example is intended to be illustrative and not restrictive), the mechanism which determines performance of the first investment portfolio may comprise at least one of computer software and computer hardware.

In another example, the mechanism which determines performance of each of the other investment portfolios may comprise at least one of computer software and computer hardware.

In another example (which example is intended to be illustrative and not restrictive), the mechanism which compares the total portfolio performance of the first investment portfolio to the total portfolio performance of the other investment portfolios held by the other investors to generate data indicative of a relative performance may comprise at least one of computer software and computer hardware.

In another example (which example is intended to be illustrative and not restrictive), the mechanism which compares the asset class composition of the first investment portfolio to the asset class composition of the other investment portfolios held by the other investors in the peer group to generate asset class deviation data may comprise at least one of computer software and computer hardware.

In another example (which example is intended to be illustrative and not restrictive), the mechanism which outputs the relative performance data and the asset class deviation data may comprise at least one of computer software and computer hardware.

In another embodiment a computer implemented method of measuring investment performance is provided, comprising: receiving data regarding a content of a first investment portfolio held by a first individual investor; assigning each of the investments in the first investment portfolio to one of a plurality of asset classes; receiving, for each of a plurality of other investment portfolios, data regarding a content of each of the other investment portfolios, wherein each of the other investment portfolios is held by a respective one of a plurality of other individual investors; assigning each of the investments in the other investment portfolios to one of a plurality of asset classes; selecting as a peer group of the first investor a subset of the other investors, wherein the selection of the peer group of the first investor is based at least in part upon at least one characteristic of the first investor, and wherein the characteristic of the first investor upon which the selection of the peer group is based is selected from the group including at least one of: (a) an age of the first investor; (b) a profession of the first investor; (c) an industry sector in which the first investor is employed (d) a job description of the first investor; (e) an education level of the first investor; (f) an income level of the first investor; (g) an amount of money that the first investor has invested in a defined contribution retirement plan; (h) a length of service of the first investor; (i) a gender of the first investor; (l) a marital status of the first investor; (k) a number of family dependents that the first investor has; (l) location; and (m) rate of savings; determining total portfolio performance of the first investment portfolio based at least in part upon the associated content; determining total portfolio performance of each of the other investment portfolios held by the other investors in the peer group based at least in part upon respective associated content; comparing the total portfolio performance of the first investment portfolio to the total portfolio performance of the other investment portfolios held by the other investors in the peer group to generate data indicative of a relative performance of the first investment portfolio; comparing the asset class composition of the first investment portfolio to the asset class composition of the other investment portfolios held by the other investors in the peer group to generate asset class deviation data indicative of a deviation in asset class composition between the first investment portfolio and the other investment portfolios held by the other investors in the peer group; and outputting the relative performance data and the asset class deviation data.

In one example (which example is intended to be illustrative and not restrictive), the first investment portfolio may be held by the first investor in connection with a defined contribution retirement plan and each of the other investment portfolios may be held by a respective one of the other investors in connection with a defined contribution retirement plan.

In another example (which example is intended to be illustrative and not restrictive), the defined contribution retirement plan associated with the first investor may be offered by an employer and the defined contribution retirement plan associated with the other investors may be offered by an employer.

In another example (which example is intended to be illustrative and not restrictive), the employer of the first investor and the other investors may be the same employer.

In another example (which example is intended to be illustrative and not restrictive), the employer of the first investor may be distinct from the employer of at least one of the other investors.

In another example (which example is intended to be illustrative and not restrictive), the employer of a first one of the other investors may be distinct from the employer of at least one of the other investors.

In another example (which example is intended to be illustrative and not restrictive), the first investment portfolio may comprise a plurality of investments and the content associated with the first investment portfolio may comprise an indication of an amount of money held in the first investment portfolio on an investment by investment basis.

In another example (which example is intended to be illustrative and not restrictive), the content associated with the first investment portfolio may comprise an indication of an amount of money held in the first investment portfolio on an investment by investment basis at a first time and at a second time.

In another example (which example is intended to be illustrative and not restrictive), the content associated with the first investment portfolio may comprise an indication of an amount of money held in the first investment portfolio on an investment by investment basis at additional times.

In another example (which example is intended to be illustrative and not restrictive), the first investment portfolio may comprise at least one investment selected from the group including: (a) at least one stock; (b) at least one bond; (c) at least one mutual find, wherein the mutual fund covers at least one asset class including: equities, bonds, real estate, commodities and currencies; (d) at least one hedge fund; (e) at least one structured product, and (f) cash In another example (which example is intended to be illustrative and not restrictive), at least one of the other investment portfolios may comprise a plurality of investments and the content associated with at least one of the other investment portfolios may comprise an indication of an amount of money held in the other investment portfolio on an investment by investment basis.

In another example (which example is intended to be illustrative and not restrictive), the content associated with at least one of the other investment portfolios may comprise an indication of an amount of money held in the other investment portfolio on an investment by investment basis at a first time and at a second time.

In another example (which example is intended to be illustrative and not restrictive), the content associated with at least one of the other investment portfolios may comprise an indication of an amount of money held in the other investment portfolio on an investment by investment basis at additional times.

In another example (which example is intended to be illustrative and not restrictive), at least one of the other investment portfolios may comprise at least one investment selected from the group including: (a) at least one stock; (b) at least one bond; (c) at least one mutual fund, wherein the mutual fund covers at least one asset class including: equities, bonds, real estate, commodities and currencies; (d) at least one hedge fund; (e) at least one structured product, and (f) cash.

In another example (which example is intended to be illustrative and not restrictive), the content associated with the first investment portfolio may comprise an indication of an amount of money put into the associated defined contribution retirement plan by the first investor and an indication of an amount of money taken out of the associated defined contribution retirement plan by the first investor.

In another example (which example is intended to be illustrative and not restrictive), the content associated with the first investment portfolio may comprise an indication of a rate of savings made by the first investor.

In another example (which example is intended to be illustrative and not restrictive), the rate of savings may be equal to a monthly savings made by the first investor divided by a monthly salary of the first investor.

In another example (which example is intended to be illustrative and not restrictive), the savings made by the first investor may be voluntary savings and may be equal to a discretionary monthly savings made by the first investor divided by the monthly salary of the first investor In another example (which example is intended to be illustrative and not restrictive), the content associated with at least one of the other investment portfolios may comprise an indication of an amount of money put into the associated defined contribution retirement plan by at least one of the other investors and an indication of an amount of money taken out of the associated defined contribution retirement plan by at least one of the other investors.

In another example (which example is intended to be illustrative and not restrictive), the content associated with at least one of the other investment portfolios may comprise an indication of a rate of savings made by at least one of the other investors.

In another example (which example is intended to be illustrative and not restrictive), the rate of savings may be equal to a monthly savings made by the other investor divided by a monthly salary of the other investor.

In another example (which example is intended to be illustrative and not restrictive), the savings made by the other investor may be voluntary savings and may be equal to a discretionary monthly savings made by the other investor divided by the monthly salary of the other investor.

In another example (which example is intended to be illustrative and not restrictive), the relative performance data may comprise an indication of the performance of the first investment portfolio relative to an average performance of the other investment portfolios.

In another example (which example is intended to be illustrative and not restrictive), the relative performance data may comprise an indication of the performance of the first investment portfolio relative to the performance of the other investment portfolios on a percentile basis.

In another example (which example is intended to be illustrative and not restrictive), the relative performance data may be output to at least one of: (a) the first investor; and (b) the employer of the first investor.

In another example (which example is intended to be illustrative and not restrictive), the relative performance data may be output to at least one of: (a) a computer screen; and (b) a printer.

In another example (which example is intended to be illustrative and not restrictive), the asset class deviation data may be output to at least one of: (a) the first investor; and (b) the employer of the first investor.

In another example (which example is intended to be illustrative and not restrictive), the asset class deviation data may be output to at least one of: (a) a computer screen; and (b) a printer.

In another example (which example is intended to be illustrative and not restrictive), the invention may further comprise outputting a distribution of the total portfolio performance of each individual investor in the peer group In another example (which example is intended to be illustrative and not restrictive), the distribution may be output to an employer of the first investor.

In another example (which example is intended to be illustrative and not restrictive), the distribution may be output to an employer of an investor in the peer group.

In another example (which example is intended to be illustrative and not restrictive), the steps may be carried out in the order recited.

In another embodiment the present invention may provide output to an employer of the average asset allocations for segments of their employee population relative to other segments of their own employee population or relative to employees at other companies (see, e.g., the examples of FIGS. 10 and 11).

In another embodiment the present invention may provide output to an employer of the average number of financial products held for segments of their employee population relative to other segments of their own employee population or relative to employees at other companies (see, e.g., the examples of FIGS. 10 and 11).

In another embodiment of the present invention liability management may be provided. This may involve generating for an employer a list of those individual employees within the employer's company having portfolio characteristics that fall outside pre-agreed parameters e.g. below a minimum acceptable level of total portfolio return, with an allocation to a particular asset class above or below a specified minimum or maximum, etc.

Of note, the embodiments described herein may, of course, be implemented using any appropriate computer hardware and/or computer software. In this regard, those of ordinary skill in the art are well versed in the type of computer hardware that may be used (e.g., a mainframe, a mini-computer, a personal computer ("PC"), a network (e.g., an intranet and/or the Internet)), the type of computer programming techniques that may be used (e.g., object oriented programming), and the type of computer programming languages that may be used (e.g., C++, Basic). The aforementioned examples are, of course, illustrative and not restrictive.

While a number of embodiments of the present invention have been described, it is understood that these embodiments are illustrative only, and not restrictive, and that many modifications may become apparent to those of ordinary skill in the art. For example, certain methods have been described herein as being "computer implementable". In this regard, it is noted that while such methods can be implemented using a computer, the methods do not necessarily have to be implemented using a computer. Also, to the extent that such methods are implemented using a computer, not every step must necessarily be implemented using a computer. Further, the specific dates, time spans, rates, prices, values and the like described with reference to the various examples are, of course, illustrative and not restrictive. Further still, while the invention has been described principally with reference to employers (e.g. corporate employers), banks and trusts, any other entity (e.g., person, organization, or group) may utilize the present invention. Further still, the portfolios may comprise (for example) at least one investment selected from the group including (but not limited to): at least one stock; at least one bond; at least one mutual fund (covering at least one asset class including (but not limited to): equities, bonds, real estate, commodities and/or currencies); at least one hedge fund; at least one structured product; and cash. Further still, the portfolios may be associated with a defined contribution retirement plan, commonly referred to using a variety of terms including but not limited to 401k plan, 404c plan, Individual Retirement Account or IRA, Keogh, Roth etc, or a wealth management or trust account. Further still, the various steps may be carried out in any desired order (and any desired steps may be added and any desired steps may be eliminated).

What is claimed is:

1. A method implemented by a computer system, comprising:

receiving, by the computer system, data regarding a plurality of investments comprising a first investment portfolio actually held by a first individual investor, wherein an individual investor is a person with a gender, marital status and education level, wherein the first investment portfolio comprises at least one investment in a first asset class and at least one investment in a second asset class, wherein the first asset class is distinct from the second asset class, and wherein the data regarding the plurality of investments comprising the first investment portfolio comprises at least one of: (a) an age of the first investor; (b) a time to retirement of the first investor; and (c) an income of the first investor;

receiving, by the computer system, for each of a plurality of other investment portfolios, data regarding a plurality of investments comprising each of the other investment portfolios, wherein each of the other investment portfolios is actually held by a respective one of a plurality of other individual investors, wherein each of the other investment portfolios comprises at least one investment in the first asset class and at least one investment in the second asset class;

determining, by the computer system, total portfolio performance of each of the investment portfolios based at least in part upon respective data regarding the plurality of investments comprising the investment portfolios, wherein each total portfolio performance of the investment portfolios comprises an approximate time-weighted percent return across all investments in each respective investment portfolio over a specified time period, i) wherein, if the specified time period is more than a month, each approximate time-weighted percent return across all investments in each respective investment portfolio over the specified time period is not impacted by a timing of cash flows into or out of each respective investment portfolio occurring on the final day of a month, and approximately corrects for the timing of any cash flows into or out of each respective investment portfolio occurring during a month, and ii) wherein, if the specified time period is less than a month, each approximate time-weighted percent return across all investments in each respective investment portfolio over the specified time period is not impacted by a timing of cash flows into or out of each respective investment portfolio occurring on the final day of the specified time period, and approximately corrects for the timing of any cash flows into or out of each respective investment portfolio occurring during the specified time period;

selecting, by the computer system, as a peer group of the first investor a subset of a group consisting of the first individual investor and the other individual investors, wherein members of the peer group of the first individual investor include at least one of the other individual investors, wherein the selection of the peer group of the first individual investor is based at least in part upon at least one characteristic of the first individual investor as indicated in the data regarding a plurality of investments comprising the first investment portfolio;

determining, by the computer system, total portfolio performance of the first investment portfolio based at least in part upon the data regarding the plurality of investments comprising the first investment portfolio if the first individual investor is not included as a member of the peer group, wherein the total portfolio performance of the first investment portfolio comprises an approximate time-weighted percent return across all investments in the first investment portfolio over the specified time period, i) wherein, if the specified time period is more than a month, the approximate time-weighted percent return across all investments in the first investment portfolio over the specified time period is not impacted by a timing of cash flows into or out of the first investment portfolio occurring on the final day of a month, and approximately corrects for the timing of any cash flows into or out of the first investment portfolio occurring during a month, and ii) wherein, if the specified time period is less than a month, the approximate time-weighted percent return across all investments in the first investment portfolio over the specified time period is not impacted by a timing of cash flows into or out of each respective investment portfolio occurring on the final day of the specified time period, and approximately corrects for the timing of any cash flows into or out of the first investment portfolio occurring during the specified time period;

aggregating, by the computer system, the total portfolio performance of each of the investment portfolios held by the members of the peer group to generate an aggregate total portfolio performance of the investment portfolios held by the members of the peer group;

comparing, by the computer system, the total portfolio performance of the first investment portfolio to the aggregated total portfolio performance of the investment portfolios held by the members of the peer group to generate data indicative of a relative performance of the first investment portfolio, wherein the relative performance of the first investment portfolio comprises at least one of: (a) a ranking of the approximate time-weighted percent return across all investments in the first investment portfolio over the specified time period versus the aggregated approximate time-weighted percent return across all investments in each respective investment portfolio held by the members of the peer group over the specified time period; and (b) the approximate time-weighted percent return across all investments in the first investment portfolio over the specified time period versus the aggregated approximate time-weighted percent return across all investments in each respective investment portfolio held by the members of the peer group over the specified time period; and outputting, by the computer system, the relative performance data.

2. The method of claim 1, wherein the first investment portfolio is held by the first investor in connection with a defined contribution retirement plan and wherein each of the other investment portfolios is held by a respective one of the other investors in connection with a defined contribution retirement plan.

3. The method of claim 2, wherein the defined contribution retirement plan associated with the first investor is offered by an employer and wherein the defined contribution retirement plan associated with the other individual investors is offered by an employer.

4. The method of claim 3, wherein the employer of the first individual investor and the other individual investors is the same employer.

5. The method of claim 3, wherein the employer of the first individual investor is distinct from the employer of at least one of the other individual investors.

6. The method of claim 3, wherein the employer of a first one of the other individual investors is distinct from the employer of at least one of the other individual investors.

7. The method of claim 2, wherein the data associated with the first investment portfolio comprises an indication of an amount of money held in the first investment portfolio on an investment by investment basis.

8. The method of claim 7, wherein the data associated with the first investment portfolio comprises an indication of an amount of money held in the first investment portfolio on an investment by investment basis at a first time and at a second time.

9. The method of claim 8, wherein the data associated with the first investment portfolio comprises an indication of an amount of money held in the first investment portfolio on an investment by investment basis at additional times.

10. The method of claim 2, wherein the first investment portfolio comprises at least one investment selected from the group including: (a) at least one stock; (b) at least one bond; (c) at least one mutual fund, wherein the mutual fund covers at least one asset class including: equities, bonds, real estate, commodities and currencies; (d) at least one hedge fund; (e) at least one structured product, and (f) cash.

11. The method of claim 2, wherein the data associated with the first investment portfolio comprises an indication of an amount of money put into the associated defined contribution retirement plan by the first investor and an indication of an amount of money taken out of the associated defined contribution retirement plan by the first individual investor.

12. The method of claim 2, wherein the data associated with the first investment portfolio comprises an indication of a rate of savings made by the first individual investor.

13. The method of claim 12, wherein the rate of savings is equal to a monthly savings made by the first individual investor divided by a monthly income of the first individual investor.

14. The method of claim 13, wherein the savings made by the first individual investor is voluntary savings and is equal to a discretionary monthly savings made by the first individual investor divided by the monthly income of the first individual investor.

15. The method of claim 2, wherein the relative performance data comprises an indication of the performance of the first investment portfolio relative to an average performance of the investment portfolios held by the members of the peer group.

16. The method of claim 2, wherein the relative performance data comprises an indication of the performance of the first investment portfolio relative to the performance of the investment portfolios held by the members of the peer group on a percentile basis.

17. The method of claim 1, further comprising outputting, by the computer system, a distribution of the total portfolio performance of each investment portfolio held by the members of the peer group.

18. The method of claim 17, wherein the distribution is output to an employer of the first individual investor.

19. The method of claim 17, wherein the distribution is output to an employer of one of the members of the peer group.

20. The method of claim 1, wherein the steps are carried out in the order recited.

21. The method of claim 1, further comprising outputting, by the computer system, a rate of savings of the first individual investor.

22. The method of claim 1, further comprising outputting, by the computer system, relative standard deviation data, wherein the relative standard deviation data comprises a standard deviation of the monthly returns of the investment portfolios held by the members of the peer group.

23. The method of claim 22, wherein the relative standard deviation data further comprises a standard deviation of the monthly returns of the first investment portfolio.

24. The method of claim 1, further comprising outputting, by the computer system, a total account balance for the first investment portfolio.

25. The method of claim 1, further comprising outputting, by the computer system, relative asset class data, wherein the relative asset class data comprises an asset class composition of the investment portfolios held by the members of the peer group.

26. The method of claim 25, wherein the relative asset class data comprises an asset class composition of the first investment portfolio.

* * * * *